(12) United States Patent
Feng et al.

(10) Patent No.: US 12,127,015 B2
(45) Date of Patent: Oct. 22, 2024

(54) COMMUNICATIONS SYSTEM, METHOD FOR CONCURRENT TRANSMISSION BETWEEN ACCESS POINTS, AND ACCESS POINT

(71) Applicant: HUAWEI TECHNOLOGIES CO., LTD., GuangDong (CN)

(72) Inventors: Bing Feng, Shanghai (CN); Shimei Zhao, Nanjing (CN); Ran Sang, Nanjing (CN); Mingyue Wang, Suzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 283 days.

(21) Appl. No.: 17/856,489

(22) Filed: Jul. 1, 2022

(65) Prior Publication Data

US 2023/0021759 A1    Jan. 26, 2023

(30) Foreign Application Priority Data

Jul. 2, 2021   (CN) .......................... 202110753652.2

(51) Int. Cl.
*H04W 24/02* (2009.01)
*H04W 52/24* (2009.01)
*H04W 56/00* (2009.01)

(52) U.S. Cl.
CPC ......... *H04W 24/02* (2013.01); *H04W 52/245* (2013.01); *H04W 56/001* (2013.01)

(58) Field of Classification Search
CPC . H04W 24/02; H04W 52/245; H04W 56/001; H04W 52/243; H04W 52/367; H04W 52/40; H04W 52/143; H04W 24/08
See application file for complete search history.

(56) References Cited

U.S. PATENT DOCUMENTS

| | | | |
|---|---|---|---|
| 9,148,908 B2 * | 9/2015 | Bhargava | H04W 74/0816 |
| 11,153,812 B1 * | 10/2021 | Mallikarjunaiah | H04W 24/02 |
| 2005/0138155 A1 | 6/2005 | Lewis | |
| 2008/0219275 A1 * | 9/2008 | Boariu | H04W 8/005 370/400 |
| 2011/0275361 A1 * | 11/2011 | Yavuz | H04W 52/245 455/422.1 |

(Continued)

FOREIGN PATENT DOCUMENTS

CN    111800792 A    10/2020

*Primary Examiner* — Dominic E Rego
(74) *Attorney, Agent, or Firm* — Rimon PC

(57) ABSTRACT

A communications system is disclosed. The communications system includes a first access point and a second access point whose operating channels overlap. The first access point and the second access point each measure a signal strength of a response frame sent by a terminal device associated with the first access point, to obtain a first signal strength and a second signal strength. The first access point determines, based on the first signal strength and the second signal strength, a power, a power upper limit, or a power adjustment value to be used by the second access point when the second access point and the first access point perform concurrent transmission. The communications system can perform a step of measuring the signal strength in the concurrent transmission between the access points, and reduce dependence on the terminal device.

20 Claims, 8 Drawing Sheets

(56) References Cited

U.S. PATENT DOCUMENTS

| | | | |
|---|---|---|---|
| 2012/0224484 A1* | 9/2012 | Babiarz | H04L 41/5019 370/235 |
| 2015/0146635 A1* | 5/2015 | Filipovich | H04W 74/0833 370/329 |
| 2015/0146704 A1* | 5/2015 | Yoon | H04W 48/14 370/338 |
| 2017/0006482 A1* | 1/2017 | Ponnuswamy | H04W 72/52 |
| 2018/0249501 A1* | 8/2018 | Ko | H04W 52/245 |
| 2019/0313317 A1* | 10/2019 | Murphy | H04W 24/02 |
| 2020/0106579 A1* | 4/2020 | Cherian | H04B 17/318 |
| 2020/0359305 A1* | 11/2020 | Chauhan | H04J 11/0076 |
| 2021/0136679 A1 | 5/2021 | Verma et al. | |
| 2021/0168619 A1* | 6/2021 | Park | H04L 5/0055 |
| 2021/0195455 A1* | 6/2021 | He | H04W 92/20 |
| 2021/0204344 A1* | 7/2021 | Babaei | H04W 72/1263 |
| 2022/0038973 A1* | 2/2022 | Scahill | H04W 36/06 |

\* cited by examiner

COMMUNICATIONS SYSTEM, METHOD FOR CONCURRENT TRANSMISSION BETWEEN ACCESS POINTS, AND ACCESS POINT

CROSS-REFERENCE TO RELATED APPLICATION

This application claims priority to Chinese Patent Application No. 202110753652.2, filed on Jul. 2, 2021, which is hereby incorporated by reference in its entirety.

TECHNICAL FIELD

This application relates to the field of communications technologies, and specifically, to a communications system, a method for concurrent transmission between access points, and an access point.

BACKGROUND

A coordinated spatial reuse (CO-SR) mechanism is a mechanism for concurrent transmission in a wireless local area network (WLAN). In a current CO-SR mechanism, a sharing access point (sharing AP) and a shared access point (shared AP) whose operating channels overlap may concurrently transmit data to terminal devices scheduled by the sharing access point and the shared access point. Because operating channels overlap, co-channel interference occurs when a primary access point and a secondary access point perform concurrent transmission.

To reduce the co-channel interference, the primary access point may send a control frame to an associated terminal device, trigger, by using the control frame, the terminal device to measure a strength of a downlink signal corresponding to the secondary access point, and then adjust a transmit power of the secondary access point based on the strength of the downlink signal corresponding to the secondary access point. This reduces the co-channel interference during the concurrent transmission.

The current manner of reducing the co-channel interference requires the terminal device associated with the primary access point to specially cooperate with the control frame to measure the strength of the downlink signal corresponding to the secondary access point, and requires the terminal device to support such measurement solution.

SUMMARY

This application provides a communications system, a method for concurrent transmission between access points, and an access point, to reduce dependence on a terminal device in a process of performing concurrent transmission between access points. This application further provides a corresponding computer-readable storage medium, a computer program product, and the like.

A first aspect provides a communications system. The communications system may be a wireless local area network (WLAN).

The communications system includes a first access point and a second access point, and operating channels of the first access point and the second access point overlap. That the operating channels overlap may include that the operating channels of the first access point and the second access point are totally or partially the same, or that an operating channel of one access point is included in an operating channel of the other access point.

The communications system further includes a first terminal device, and the first terminal device is associated with the first access point, but is not associated with the second access point. "Association" herein is used to establish a mapping between an access point (AP) and a station (STA) and enable a service of the STA.

In a process of concurrent transmission between access points, the first access point and the second access point have the following functions:

The first access point is configured to: send a first downlink frame to the first terminal device, receive, from the first terminal device, a first response frame corresponding to the first downlink frame, and measure a signal strength of the first response frame to obtain a first signal strength. The first downlink frame may be a data frame, a management frame, or a ready to send (RTS) frame, and the first response frame may be an acknowledgment (ACK) frame, a block acknowledgment (block ACK, BA) frame, or a clear to send (CTS) frame. If the first downlink frame is a data frame, the first response frame is usually an ACK frame or a BA frame. If the first downlink frame is a management frame, the first response frame is usually an ACK frame or a BA frame. If the first downlink frame is an RTS frame, the first response frame is usually a CTS frame. The first signal strength may be represented in a form of a received signal strength indicator (RSSI), or may be represented in another form.

The second access point is configured to: measure a signal strength of the first response frame to obtain a second signal strength, and send a message to the first access point to indicate the second signal strength. The second signal strength may be represented in a form of an RSSI, or may be represented in another form.

The first access point is further configured to determine, based on the first signal strength and the second signal strength, a power, a power upper limit, or a power adjustment value to be used by the second access point when the second access point and the first access point perform the concurrent transmission. The power indicates a transmit power to be used by the second access point when the second access point performs the concurrent transmission. The power upper limit may indicate the second access point to adjust the transmit power without exceeding the power upper limit. The power adjustment value indicates to the second access point to adjust the transmit power based on the power adjustment value. The transmit power herein indicates a real power used by the second access point when the second access point transmits a signal. For example, if the second access point transmits a signal at 18 decibels-milliwatts (dBmW or dBm), the transmit power is 18 dBm.

In the communications system, the first access point and the second access point each can measure the signal strength by using the first response frame in a process of communication between the first access point and the first terminal device, without relying on the first terminal device to measure a strength of a downlink signal between the first access point and the second access point. This reduces dependence on the terminal device in a process of measuring the signal strength in the concurrent transmission between the access points.

With reference to the first aspect, in a first implementation of the first aspect, the first access point is further configured to: perform time synchronization with the second access point, and record a first time, where the first time is a time at which the first access point receives the first response frame. There may be a plurality of methods for performing the time synchronization, for example, performing time synchronization by using a beacon frame, performing time synchronization by using a network time protocol (NTP), or performing time synchronization by using a precision time protocol (PTP). The first time may be recorded in a form of a timestamp. The first access point associates the first time with the first signal strength.

The second access point is further configured to indicate a second time to the first access point, where the second time is a time at which the second access point receives the first response frame. The second time may be recorded in a form of a timestamp. The second time and the second signal strength are usually indicated by a same message sent to the first access point.

The first access point is further configured to determine, based on the first time and the second time, that the first signal strength and the second signal strength are from a same response frame. If the first signal strength and the second signal strength are from the same response frame, the first time and the second time are usually the same, or an absolute value of a difference between the first time and the second time is less than a preset threshold. Therefore, the second signal strength from the same response frame as the first signal strength can be determined based on the first time and the second time.

In the first implementation, the first access point determines, based on the first time and the second time, that the first signal strength and the second signal strength are from a same response frame. This can diminish the impact of the different transmit powers at which the first terminal device transmits different response frames on the signal strength measured by the second access point, and improve the accuracy of the power, the power upper limit, or the power adjustment value that is determined by the first access point based on the first signal strength and the second signal strength and that is to be used by the second access point when the second access point and the first access point perform the concurrent transmission.

With reference to the first aspect, or the first implementation of the first aspect, in a second implementation of the first aspect, the first access point is further configured to: when the first access point is a primary access point in the concurrent transmission and the first terminal device is a destination end in the concurrent transmission, determine, based on at least one factor, that the second access point is a secondary access point in the concurrent transmission, where the at least one factor includes the first signal strength and the second signal strength.

A primary access point is referred to as a sharing access point (sharing AP) in a coordinated spatial reuse (CO-SR) mechanism, and a secondary access point is referred to as a shared access point (shared AP) in the CO-SR mechanism. The primary access point and the secondary access point may also be referred to by other names in another concurrent transmission mechanism.

In the second implementation, the first access point determines the secondary access point based on the first signal strength and the second signal strength. This can reduce co-channel interference generated when the primary access point and the secondary access point perform the concurrent transmission between the access points.

With reference to the second implementation of the first aspect, in a third implementation of the first aspect, the first access point is specifically configured to determine, in a plurality of candidate access points based on a difference between the first signal strength and the second signal strength, that the second access point is the secondary access point in the concurrent transmission, where the difference between the first signal strength and the second signal strength is the largest of the differences between the first signal strength and signal strengths corresponding to the plurality of candidate access points.

An operating channel of each of the plurality of candidate access points overlaps the operating channel of the first access point. Each candidate access point may receive a response frame sent by the first terminal device, each candidate access point receives the first response frame, and each candidate access point notifies the first access point of a signal strength obtained by measuring a signal strength of the first response frame. When determining the secondary access point, the primary access point determines a candidate access point corresponding to the smallest signal strength as the secondary access point. During the concurrent transmission, a strength of a signal from the candidate access point is the smallest when the signal reaches the first terminal device, so that interference to the first terminal device is the smallest. If determining the secondary access point based on a difference between signal strengths, the primary access point determines a candidate access point corresponding to the largest difference of the differences between signal strengths measured by candidate access points and the first signal strength as the secondary access point. If each candidate access point receives a different response frame sent by the first terminal device, in this case, an access point corresponding to the largest difference of the differences about signal strengths corresponding to the plurality of candidate access points may be determined as the secondary access point. For example, the primary access point receives a response frame A sent by the first terminal device, and measures a signal strength of the response frame A to obtain a signal strength A1. A candidate access point 1 receives the response frame A, and measures a signal strength of the response frame A to obtain a signal strength A2. The primary access point receives a response frame B sent by the first terminal device, and measures a signal strength of the response frame B to obtain a signal strength B1. A candidate access point 2 receives the response frame B, and measures a signal strength of the response frame B to obtain a signal strength B2. The primary access point receives a response frame C sent by the first terminal device, and measures a signal strength of the response frame C to obtain a signal strength C1. A candidate access point 3 receives the response frame C, and measures a signal strength of the response frame C to obtain a signal strength C2. In this example, the primary access point determines a candidate access point corresponding to the largest difference as between a difference between the signal strength A1 and the signal strength A2, a difference between the signal strength B1 and the signal strength B2, and a difference between the signal strength C1 and the signal strength C2 as the secondary access point. For example, if the difference between the signal strength A1 and the signal strength A2 is the largest, the primary access point determines the candidate access point 1 as the secondary access point.

A unit of the signal strength may be milliwatt, or may be decibel-milliwatt (dBm). A unit of the signal strength used in this application is dBm. Therefore, a difference between signal strengths is used as a selection condition.

In the third implementation, because the difference between the first signal strength and the second signal strength is the largest as between the differences between the first signal strength and the signal strengths corresponding to the plurality of candidate access points, the strength of the signal from the selected secondary access point is the smallest when the signal reaches the first terminal device.

This has the smallest interference to the first terminal device, and helps improve concurrent transmission quality.

With reference to the second implementation of the first aspect, in a fourth implementation of the first aspect, the first access point is specifically configured to determine, based on the first signal strength, the second signal strength, and service requirements of a plurality of candidate access points, that the second access point is the secondary access point in the concurrent transmission.

The service requirements of the plurality of candidate access points may be sent by the plurality of candidate access points to the first access point in advance. The service requirement may include at least one of a service type, a traffic identifier (TID), a buffer size, a guarantee requirement level, or a service priority.

In the fourth implementation, when the secondary access point is determined, the signal strengths can be preferably considered, and then the service requirements are considered. For example, at least two first ranked candidate access points are first selected from the candidate access points corresponding to differences about signal strengths sorted in descending order, and then at least one candidate access point with the highest service priority is selected from the at least two candidate access points as the secondary access point. Alternatively, the service requirements can be preferably considered, and then the signal strength is considered. For example, at least two first ranked candidate access points are first selected from the candidate access points corresponding to service priorities sorted in descending order, and then at least one candidate access point corresponding to the largest difference about the signal strengths is selected from the at least two candidate access points as the secondary access point. The secondary access point is determined with reference to the signal strength and the service requirement, and such manner helps transmit a high-priority service in advance.

With reference to the first aspect and the first to the fourth implementations of the first aspect, in a fifth implementation of the first aspect, the first access point is further configured to determine an interference requirement of the first terminal device based on a transmission mode used for the first terminal device when the concurrent transmission is performed. The transmission mode may include one or more of the following transmission-related information: a power, a quantity of space-time streams, a transmission rate, a modulation and coding scheme (MCS), and the like when the first access point performs the concurrent transmission. The interference requirement indicates a requirement of the first terminal device on signal quality, for example, a signal to interference plus noise ratio (SINR) or a signal-to-interference ratio (SIR).

The first access point is specifically configured to: determine, based on the first signal strength and the second signal strength, the power, the power upper limit, or the power adjustment value to be used by the second access point when the second access point and the first access point perform the concurrent transmission, and notify the second access point of the power, the power upper limit, or the power adjustment value of the second access point. In this way, the second access point determines the transmit power based on the power, the power upper limit, or the power adjustment value of the second access point, and then sends a signal at the transmit power, so that the interference requirement of the first terminal device is met after the signal sent at the transmit power is adjusted based on the difference between the first signal strength and the second signal strength. The transmit power herein indicates a real power used by the second access point when the second access point transmits the signal, and may include a power of the second access point determined by the first access point, a power selected by the second access point based on the power upper limit, or a power obtained through adjustment by the second access point based on the power adjustment value.

In the fifth implementation, the first access point determines the power of the second access point. For example, if the first access point determines that the power of the second access point is 16 dBm, the power of the second access point is 16 dBm. When the power selected by the second access point based on the power upper limit is determined, for example, if the power upper limit is 18 dBm, and the second access point transmits the signal at the transmit power of 16 dBm, the power selected by the second access point based on the power upper limit is 16 dBm. When the power obtained through adjustment by the second access point based on the power adjustment value is determined, for example, if the power adjustment value is 2 dB, and the second access point transmits the signal at the transmit power of 16 dBm after 2 dB is decreased based on a current power of 18 dBm, the power obtained through adjustment by the second access point based on the power adjustment value is 16 dBm. The first access point can indicate the transmit power of the second access point based on the interference requirement and the difference between the first signal strength and the second signal strength. When the second access point performs the concurrent transmission at the transmit power, interference to the first terminal device can be reduced, thereby meeting the interference requirement of the first terminal device.

With reference to the first aspect and the first to the fifth implementations of the first aspect, in a sixth implementation of the first aspect, the second access point is further configured to: send a second downlink frame to a second terminal device, receive, from the second terminal device, a second response frame corresponding to the second downlink frame, and measure a signal strength of the second response frame to obtain a third signal strength, where the second terminal device is associated with the second access point, and the second terminal device is not associated with the first access point. For types of the second downlink frame and the second response frame and a relationship between the second downlink frame and the second response frame, refer to the types of the first downlink frame and the first response frame and the relationship between the first downlink frame and the first response frame in the first aspect for understanding.

The first access point is further configured to: measure a signal strength of the second response frame to obtain a fourth signal strength, and send a message to the second access point to indicate the fourth signal strength.

The second access point is further configured to schedule, based on a difference between the third signal strength and the fourth signal strength, the second terminal device to serve as a destination end of the second access point when the concurrent transmission is performed.

In the sixth implementation, a larger difference between the third signal strength and the fourth signal strength indicates smaller impact of the first access point on the second terminal device. The second terminal device is scheduled as the destination end, and this can improve data transmission quality during the concurrent transmission.

With reference to the sixth implementation of the first aspect, in a seventh implementation of the first aspect, the second access point is further configured to: determine an interference requirement of the second terminal device based on the difference between the third signal strength and the fourth signal strength, and the power, the power upper limit, or the power adjustment value to be used by the second access point when the second access point and the first access point perform the concurrent transmission, and determine a transmission mode to be used for the second terminal device based on the interference requirement of the second terminal device.

In the seventh implementation, the second access point determines the transmission mode to be used for the second terminal device based on the interference requirement of the second terminal, so that the second access point communicates with the second terminal device in the corresponding transmission mode. This can reduce interference to the second terminal device, and improve data transmission quality during the concurrent transmission.

With reference to the first aspect and the first to the seventh implementations of the first aspect, in an eighth implementation of the first aspect, the first access point is further configured to send a coordinated frame to the second access point, where the coordinated frame includes information about the concurrent transmission and information about a next concurrent transmission, the information about the concurrent transmission is used to indicate content in the concurrent transmission, and the information about the next concurrent transmission is used to indicate the second access point to pre-schedule content in the next concurrent transmission. The information about the concurrent transmission may include the power, the power upper limit, or the power adjustment value to be used by the second access point when the second access point performs the concurrent transmission during the concurrent transmission. The information about the next concurrent transmission may include a format of data in the next concurrent transmission.

The second access point is further configured to: concurrently transmit, based on the information about the concurrent transmission, the content in the concurrent transmission with the first access point, and pre-schedule, based on the information about the next concurrent transmission, the content in the next concurrent transmission.

In the eighth implementation, when performing the concurrent transmission, the second access point can pre-schedule the content in the next concurrent transmission. This can reduce a processing delay in the concurrent transmission when the next concurrent transmission is performed, and improve transmission efficiency of the next concurrent transmission.

With reference to the first aspect and the first to the eighth implementations of the first aspect, in a ninth implementation of the first aspect, the second access point is further configured to enable a function of receiving the first response frame.

With reference to the first aspect and the first to the ninth implementations of the first aspect, in a tenth implementation of the first aspect, the second access point is specifically configured to send, through a wired network, the message to the first access point to indicate the second signal strength.

In the tenth implementation, the message is sent between the access points through the wired network, so that occupation of an air interface resource is further reduced.

A second aspect provides a method for concurrent transmission between access points. The method provided in the second aspect is applicable to the communications system provided in the first aspect, and the method includes:

A first access point sends a first downlink frame to a first terminal device, where the first terminal device is associated with the first access point.

The first access point receives, from the first terminal device, a first response frame corresponding to the first downlink frame.

The first access point measures a signal strength of the first response frame to obtain a first signal strength.

The first access point receives a message that is sent by a second access point and that indicates a second signal strength, where the second signal strength is a signal strength of the first response frame measured by the second access point, the first terminal device is not associated with the second access point, and an operating channel of the second access point overlaps an operating channel of the first access point.

The first access point determines, based on the first signal strength and the second signal strength, a power, a power upper limit, or a power adjustment value to be used by the second access point when the second access point and the first access point perform concurrent transmission.

With reference to the second aspect, in a first implementation of the second aspect, the method further includes:

The first access point performs time synchronization with the second access point, and records a first time, where the first time is a time at which the first access point receives the first response frame.

The first access point receives a second time sent by the second access point, where the second time is a time at which the second access point receives the first response frame.

The first access point determines, based on the first time and the second time, that the first signal strength and the second signal strength are from a same response frame.

With reference to the second aspect or the first implementation of the second aspect, in a second implementation of the second aspect, the method further includes:

When the first access point is a primary access point in the concurrent transmission and the first terminal device is a destination end in the concurrent transmission, the first access point determines, based on at least one factor, that the second access point is a secondary access point in the concurrent transmission, where the at least one factor includes the first signal strength and the second signal strength.

With reference to the second implementation of the second aspect, in a third implementation of the second aspect, the foregoing step that the first access point determines, based on at least one factor, that the second access point is a secondary access point in the concurrent transmission includes:

The first access point determines, in a plurality of candidate access points based on a difference between the first signal strength and the second signal strength, that the second access point is the secondary access point in the concurrent transmission, where the difference between the first signal strength and the second signal strength is the largest of the differences between the first signal strength and signal strengths corresponding to the plurality of candidate access points.

With reference to the second implementation of the second aspect, in a fourth implementation of the second aspect, the foregoing step that the first access point determines, based on at least one factor, that the second access point is a secondary access point in the concurrent transmission includes:

The first access point determines, based on the first signal strength, the second signal strength, and service requirements of a plurality of candidate access points, that the second access point is the secondary access point in the concurrent transmission.

With reference to the second aspect and the first to the fourth implementations of the second aspect, in a fifth implementation of the second aspect, the foregoing step that the first access point determines, based on the first signal strength and the second signal strength, a power, a power upper limit, or a power adjustment value to be used by the second access point when the second access point and the first access point perform concurrent transmission includes:

The first access point determines an interference requirement of the first terminal device based on a transmission mode used for the first terminal device when the concurrent transmission is performed.

The first access point determines, based on the first signal strength and the second signal strength, the power, the power upper limit, or the power adjustment value to be used by the second access point when the second access point and the first access point perform the concurrent transmission, where a signal sent by the second access point at a transmit power meets the interference requirement of the first terminal device after being adjusted based on the difference between the first signal strength and the second signal strength, and the transmit power includes the power determined by the first access point, a power selected by the second access point based on the power upper limit, or a power obtained through adjustment by the second access point based on the power adjustment value.

With reference to the second aspect and the first to the fifth implementations of the second aspect, in a sixth implementation of the second aspect, the method further includes:

The first access point obtains a fourth signal strength through a measurement on a second response frame on which the second access point obtains a third signal strength through a measurement, where the second response frame is sent by a second terminal device in response to a second downlink frame sent by the second access point, the second terminal device is associated with the second access point, and the second terminal device is not associated with the first access point.

The first access point sends a message to the second access point to indicate the fourth signal strength.

With reference to the second aspect and the first to the sixth implementations of the second aspect, in a seventh implementation of the second aspect, the method further includes:

The first access point sends a coordinated frame to the second access point, where the coordinated frame includes information about the concurrent transmission and information about a next concurrent transmission, the information about the concurrent transmission is used to indicate content in the concurrent transmission, and the information about the next concurrent transmission is used to indicate to the second access point to pre-schedule content in the next concurrent transmission.

For features and related effects in the second aspect or any implementation of the second aspect, refer to related content in the first aspect for understanding.

A third aspect provides a method for concurrent transmission between access points. The method provided in the third aspect is applicable to the communications system provided in the first aspect, and the method includes:

A second access point receives a first response frame, where the first response frame is sent by a first terminal device in response to a first downlink frame from a first access point, the first response frame is used by the first access point to measure a signal strength of the first response frame to obtain a first signal strength, and the first terminal device is associated with the first access point.

The second access point measures a signal strength of the first response frame to obtain a second signal strength, where the first terminal device is not associated with the second access point.

The second access point sends a message to the first access point to indicate the second signal strength, where the second signal strength is used by the first access point to determine, based on the first signal strength, a power, a power upper limit, or a power adjustment value to be used by the second access point when the second access point and the first access point perform concurrent transmission.

With reference to the third aspect, in a first implementation of the third aspect, the method further includes:

The second access point performs time synchronization with the first access point, and records a second time, where the second time is a time at which the second access point receives the first response frame, the second time is used by the first access point to determine, with reference to a first time, that the first signal strength and the second signal strength are from a same response frame, and the first time is a time at which the first access point receives the first response frame.

With reference to the third aspect or the first implementation of the third aspect, in a second implementation of the third aspect, the method further includes:

The second access point sends a second downlink frame to a second terminal device, where the second terminal device is associated with the second access point, and the second terminal device is not associated with the first access point.

The second access point receives, from the second terminal device, a second response frame corresponding to the second downlink frame.

The second access point measures a signal strength of the second response frame to obtain a third signal strength.

The second access point receives a message that is sent by the first access point and that indicates a fourth signal strength, where the fourth signal strength is obtained by the first access point by measuring a signal strength of the second response frame.

The second access point schedules, based on a difference between the third signal strength and the fourth signal strength, the second terminal device to serve as a destination end of the second access point when the concurrent transmission is performed.

With reference to the third aspect or the second implementation of the third aspect, in a third implementation of the third aspect, the method further includes:

The second access point determines an interference requirement of the second terminal device based on the difference between the third signal strength and the fourth signal strength, and the power, the power upper limit, or the power adjustment value to be used by the second access point when the second access point and the first access point perform the concurrent transmission, and determines a transmission mode to be used for the second terminal device based on the interference requirement of the second terminal device.

With reference to the third aspect, and the first to the third implementations of the third aspect, in a fourth implementation of the third aspect, the method further includes:

The second access point receives a coordinated frame, where the coordinated frame includes information about the concurrent transmission and information about a next concurrent transmission, the information about the concurrent transmission is used to indicate content in the concurrent transmission, and the information about the next concurrent transmission is used to indicate to the second access point to pre-schedule content in the next concurrent transmission.

The second access point concurrently transmits, based on the information about the concurrent transmission, the content in the concurrent transmission with the first access point, and pre-schedules, based on the information about the next concurrent transmission, the content in the next concurrent transmission.

With reference to the third aspect, and the first to the fourth implementations of the third aspect, in a fifth implementation of the third aspect, the method further includes:

The second access point enables a function of receiving the first response frame.

With reference to the third aspect, and the first to the fifth implementations of the third aspect, in a sixth implementation of the third aspect, that the second access point sends the message to the first access point to indicate the second signal strength includes:

The second access point sends, through a wired network, the message to the first access point to indicate the second signal strength.

For features and related effects in the third aspect or any implementation of the third aspect, refer to related content in the first aspect for understanding.

A fourth aspect of this application provides an access point, configured to perform the method according to any one of the second aspect or the possible implementations of the second aspect. Specifically, the access point includes modules or units configured to perform the method according to any one of the second aspect or the possible implementations of the second aspect, for example, a receiving unit, a processing unit, and a sending unit.

A fifth aspect of this application provides an access point, configured to perform the method according to any one of the third aspect or the possible implementations of the third aspect. Specifically, the access point includes modules or units configured to perform the method according to any one of the third aspect or the possible implementations of the third aspect, for example, a receiving unit, a processing unit, and a sending unit.

A sixth aspect of this application provides an access point. The access point includes a processor and a computer-readable storage medium storing a computer program. The processor is coupled to the computer-readable storage medium, and computer-executable instructions run on the processor. When the computer-executable instructions are executed by the processor, the processor performs the method according to any one of the second aspect or the possible implementations of the second aspect. Optionally, the access point may further include an input/output (I/O) interface, and the computer-readable storage medium storing the computer program may be a memory.

A seventh aspect of this application provides an access point. The access point includes a processor and a computer-readable storage medium storing a computer program. The processor is coupled to the computer-readable storage medium, and the computer-executable instructions run on the processor. When the computer-executable instructions are executed by the processor, the processor performs the method according to any one of the third aspect or the possible implementations of the third aspect. Optionally, the access point may further include an input/output (I/O) interface, and the computer-readable storage medium storing the computer program may be a memory.

An eighth aspect of this application provides a computer-readable storage medium storing one or more computer-executable instructions. When the computer-executable instructions are executed by a processor, the processor performs the method according to any one of the second aspect or the possible implementations of the second aspect.

A ninth aspect of this application provides a computer-readable storage medium storing one or more computer-executable instructions. When the computer-executable instructions are executed by a processor, the processor performs the method according to any one of the third aspect or the possible implementations of the third aspect.

A tenth aspect of this application provides a computer program product storing one or more computer-executable instructions. When the computer-executable instructions are executed by a processor, the processor performs the method according to any one of the second aspect or the possible implementations of the second aspect.

An eleventh aspect of this application provides a computer program product storing one or more computer-executable instructions. When the computer-executable instructions are executed by a processor, the processor performs the method according to any one of the third aspect or the possible implementations of the third aspect.

A twelfth aspect of this application provides a chip. The chip includes at least one processor and an interface, the interface is used to receive data and/or a signal, and the at least one processor is configured to support an access point in implementing a function according to any one of the second aspect or the possible implementations of the second aspect. In a possible design, the chip may further include a memory. The memory is configured to store program instructions and data that are necessary for a computer device.

A thirteenth aspect of this application provides a chip. The chip includes at least one processor and an interface, the interface is used to receive data and/or a signal, and the at least one processor is configured to support an access point in implementing a function according to any one of the third aspect or the possible implementations of the third aspect. In a possible design, the chip may further include a memory. The memory is configured to store program instructions and data that are necessary for a computer device.

DESCRIPTION OF EMBODIMENTS

The following describes embodiments of this application with reference to the accompanying drawings. It is clear that the described embodiments are merely some rather than all of the embodiments of this application. A person of ordinary skill in the art may learn that the technical solutions provided in embodiments of this application are also applicable to a similar technical problem as technology evolves and new scenarios emerge.

In the specification, claims, and accompanying drawings of this application, the terms "first", "second", and the like are intended to distinguish between similar objects but do not necessarily indicate a specific order or sequence. It should be understood that data termed in such a way is interchangeable in appropriate circumstances, so that embodiments described herein can be implemented in other orders than the content illustrated or described herein. Moreover, terms "include", "contain" and any other variants thereof mean to cover the non-exclusive inclusion. For example, a process, a method, a system, a product, or a device that includes a list of steps or units is not necessarily limited to those expressly listed steps or units, but may include other steps or units not expressly listed or inherent to such the process, the method, the product, or the device.

Embodiments of this application provide a communications system, a method for concurrent transmission between access points, and an access point, to reduce dependency on a terminal device, reduce occupation of resources on the terminal device, and reduce consumption of air interface resources of an access point in a process of performing concurrent transmission between access points. Embodiments of this application further provide a corresponding computer-readable storage medium, a computer program product, and the like. Detailed descriptions are provided separately below.

Figure 1:
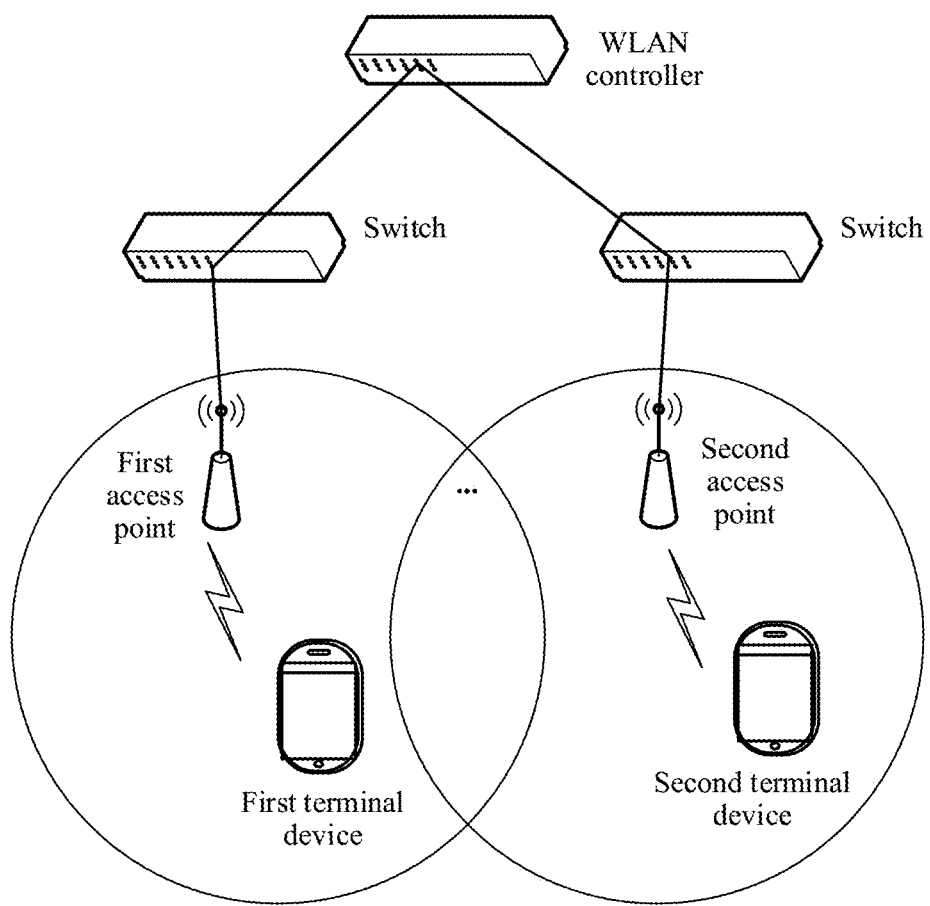
FIG. 1 is a schematic diagram of an architecture of a communications system.

The method for concurrent transmission between access points provided in embodiments of this application may be applied to a communications system shown in FIG. 1. The communications system may be understood as a communications architecture based on coordinated spatial reuse (CO-SR), or may be a communications architecture based on other concurrent transmission. The communications system may also be referred to as a wireless local area network (WLAN).

As shown in FIG. 1, the communications system includes a plurality of access points (AP) and terminal devices. Wireless communication is performed between the access points and the terminal devices through air interfaces, and wired communication may be performed between the plurality of access points through switches or a WLAN controller (for example, an access controller (AC)). The WLAN controller is responsible for managing the AP. The AP is connected to and gains access to the switch in a wired manner, and the switch is connected to the WLAN controller in a wired manner. It should be noted that "a plurality of" in embodiments of this application includes two or more, or may be described as at least two.

The terminal device may be a mobile phone, a tablet computer (pad), a computer having a wireless transceiver function, a virtual reality (VR) terminal, an augmented reality (AR) terminal, a wireless terminal in industrial control, a wireless terminal in self-driving, a remote wireless medical terminal, a wireless terminal in a smart grid, a wireless terminal in transportation safety, a wireless terminal in a smart city, a wireless terminal in a smart home, or the like.

The plurality of access points in the communications system include a first access point and a second access point, and operating channels of the first access point and the second access point overlap. That the operating channels overlap may include that the operating channels of the first access point and the second access point are totally or partially the same, or that an operating channel of one access point is included in an operating channel of the other access point.

In the communications system, a terminal device associated with the first access point is referred to as a first terminal device, and a terminal device associated with the second access point is referred to as a second terminal device. The first terminal device is associated with the first access point, but is not associated with the second access point. The second terminal device is associated with the second access point, but is not associated with the first access point. "Association" herein is used to establish a mapping between an access point (AP) and a station (STA) and enable a service of the STA.

To improve a network throughput, access points whose operating channels overlap in the communications system may perform concurrent transmission. The concurrent transmission indicates that the access points simultaneously transmit data to terminal devices associated with the access points. The operating channels of the access points for the concurrent transmission overlap, and therefore the concurrent transmission generates co-channel interference to the terminal devices. To reduce the co-channel interference of the concurrent transmission, in a process of the concurrent transmission between the access points, the first access point and the second access point in the communications system provided in this embodiment of this application have the following functions:

The first access point is configured to: send a first downlink frame to the first terminal device, receive, from the first terminal device, a first response frame corresponding to the first downlink frame, and measure a signal strength of the first response frame to obtain a first signal strength.

The first downlink frame may be a data frame, a management frame, or a ready to send (RTS) frame, and the first response frame is an acknowledgment (ACK) frame, a block acknowledgment (block ACK, BA) frame, or a clear to send (CTS) frame. If the first downlink frame is a data frame, the first response frame is usually an ACK frame or a BA frame. If the first downlink frame is a management frame, the first response frame is usually an ACK frame or a BA frame. If the first downlink frame is an RTS frame, the first response frame is usually a CTS frame. The first signal strength may be represented in a form of a received signal strength indicator (RSSI), or may be represented in another form.

The second access point is configured to: measure a signal strength of the first response frame to obtain a second signal strength, and send a message to the first access point to indicate the second signal strength.

The second signal strength may be represented in a form of an RSSI, or may be represented in another form.

The first access point is further configured to determine, based on the first signal strength and the second signal strength, a power, a power upper limit, or a power adjustment value to be used by the second access point when the second access point and the first access point perform the concurrent transmission.

The power of the second access point indicates a transmit power to be used by the second access point when the second access point performs the concurrent transmission. The power upper limit may indicate to the second access point to adjust the transmit power without exceeding the power upper limit. The power adjustment value indicates to the second access point to adjust the transmit power based on the power adjustment value. The transmit power in this application indicates a real power used by the second access point when the second access point transmits a signal. For example, if the second access point transmits a signal at 18 decibels-milliwatts (dBmW or dBm), the transmit power is 18 dBm.

In the communications system, the first access point and the second access point each can measure the signal strength by using the first response frame in a process of communication between the first access point and the first terminal device, without relying on the first terminal device to measure a strength of a downlink signal between the first access point and the second access point. This reduces dependence on the terminal device in a process of measuring the signal strength in the concurrent transmission between the access points.

Optionally, in this embodiment of this application, as shown in FIG. 1, the second access point is specifically configured to send the message to the first access point through the wired network of the switches and the WLAN controller, to indicate the second signal strength. This can reduce consumption of air interface resources.

Optionally, in this embodiment of this application, when the access point is started or before the access point receives the response frame, the access point starts a function of receiving the response frame of a non-associated terminal device. For example, the second access point is further configured to enable a function of receiving the first response frame.

In the foregoing communications system, the first access point and the second access point may perform a concurrent transmission process. For the process in which the first access point and the second access point perform the concurrent transmission, refer to the following embodiments of a method for concurrent transmission between access points for understanding. Likewise, the steps performed by the first access point and the second access point in embodiments of the method for concurrent transmission between access points described below may be understood as functions of the first access point and the second access point in the communications system. The following describes the method for concurrent transmission between access points provided in embodiments of this application with reference to the accompanying drawings.

Figure 2:
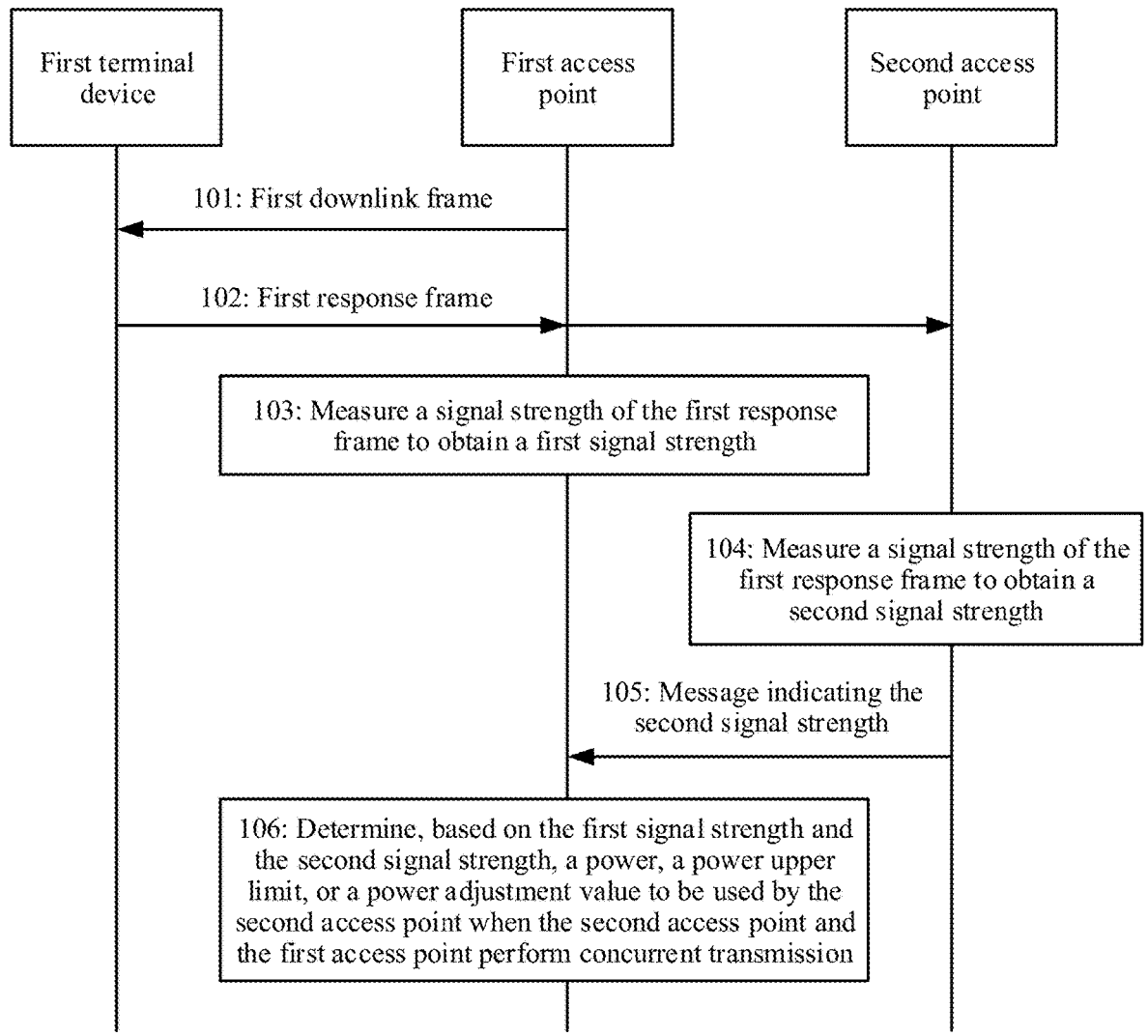
FIG. 2 is a schematic diagram of an embodiment of a method for concurrent transmission between access points according to an embodiment of this application.

FIG. 2 shows an embodiment of the method for concurrent transmission between access points according to embodiments of this application. The following steps are included.

101: A first access point sends a first downlink frame to a first terminal device.

102: The first access point receives, from the first terminal device, a first response frame corresponding to the first downlink frame. Correspondingly, a second access point also receives the first response frame.

103: The first access point measures a signal strength of the first response frame to obtain a first signal strength.

104: The second access point measures a signal strength of the first response frame to obtain a second signal strength.

105: The second access point sends a message to the first access point to indicate the second signal strength. Correspondingly, the first access point receives the message that is sent by the second access point and that indicates the second signal strength.

106: The first access point determines, based on the first signal strength and the second signal strength, a power, a power upper limit, or a power adjustment value to be used by the second access point when the second access point and the first access point perform concurrent transmission.

In embodiments of this application, in step 106, a signal to interference plus noise ratio (SINR) or a signal-to-interference ratio (SIR) of the first terminal device can be determined based on the first signal strength and the second signal strength. Then, the power, the power upper limit, or the power adjustment value to be used by the second access point when the second access point and the first access point perform the concurrent transmission is determined based on the signal to interference plus noise ratio or the signal-to-interference ratio of the first terminal device. Descriptions are provided below by using an example in which the signal to interference plus noise ratio of the first terminal device is determined.

Figure 3:
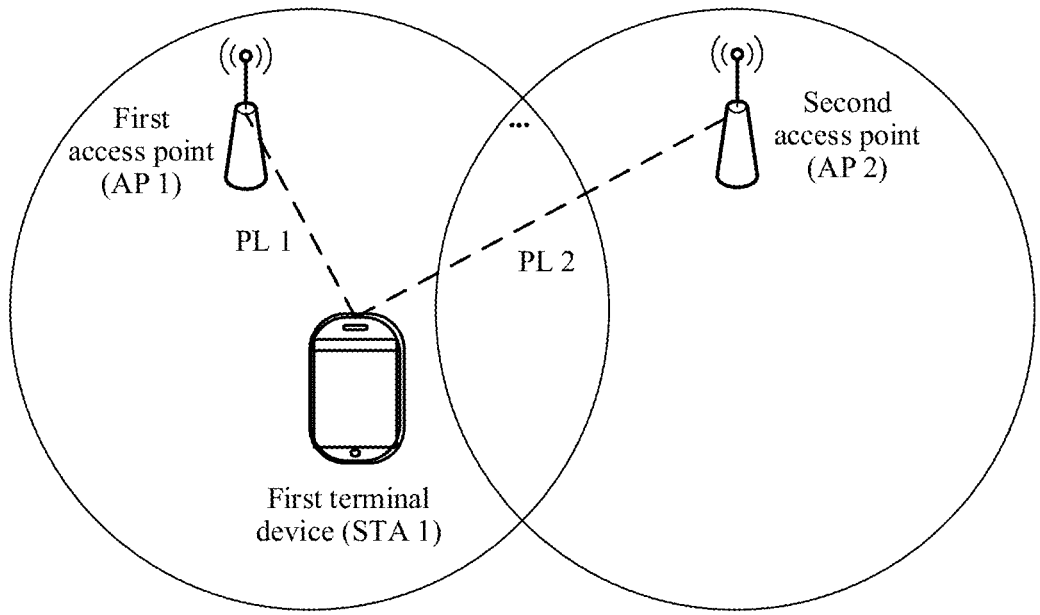
FIG. 3 is a schematic diagram of a scenario of a method for concurrent transmission between access points according to an embodiment of this application.

For a process in which the first access point determines the signal to interference plus noise ratio of the first terminal device, refer to FIG. 3 for understanding.

As shown in FIG. 3, the first terminal device is represented by using an STA 1, the first access point is represented by using an AP 1, and a second access point is represented by using an AP 2. A path loss from the STA 1 to the AP 1 is represented by using a PL 1, and a path loss from the STA 1 to the AP 2 is represented by using a PL 2.

Then, $SINR_{STA1}=TxAP1-PL1-(TxAP2-PL2)=TxAP1-TxAP2+PL2-PL1$.

$SINR_{STA1}$ indicates the signal to interference plus noise ratio of the STA 1, TxAP1 indicates a transmit power of the AP 1, and TxAP2 indicates a transmit power of the AP 2.

The AP 1 may obtain a signal strength R[STA1][AP1] from the STA 1 to the AP 1 through a measurement by using a first response frame. In addition, R[STA1][AP1] may be represented by using a formula R[STA1][AP1]=TxSP1−PL1, and then PL1=TxSP1−R[STA1][AP1].

The AP 2 may obtain a signal strength R[STA1][AP2] from the STA 1 to the AP 2 through a measurement by using the first response frame. In addition, R[STA1][AP2] may be represented by using a formula R[STA1][AP2]=TxSP1−PL2, and then PL2=TxSP1−R[STA1][AP2].

Then, PL2−PL1=TxSP1−R[STA1][AP2]−(TxSP1−R[STA1][AP1])=R[STA1][AP1]−R[STA1][AP2].

Then, $SINR_{STA1}$=TxAP1−TxAP2+R[STA1][AP1]−R[STA1][AP2].

Because R[STA1][AP1] and R[STA1][AP2] have been obtained through a measurement, $SINR_{STA1}$ may be determined when TxAP1 and TxAP2 are known. Alternatively, if there is a specified requirement that $SINR_{STA1}$ cannot be lower than a threshold, when TxAP1 is known, a requirement on TxAP2 or TxAP2 may be determined, for example, a power upper limit or a power adjustment value of TxAP2.

Figure 4:
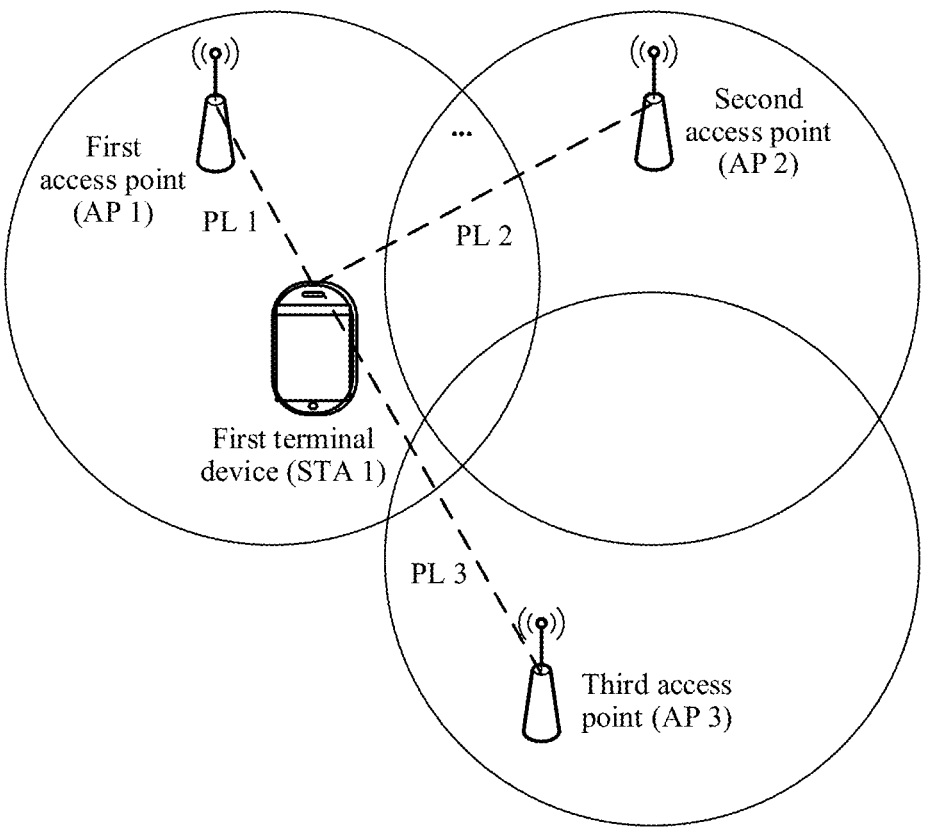
FIG. 4 is a schematic diagram of another scenario of a method for concurrent transmission between access points according to an embodiment of this application.

The foregoing describes a process of determining the signal to interference plus noise ratio of the first terminal device when the two APs perform concurrent transmission. If three or more APs perform concurrent transmission, a method of calculating the signal to interference plus noise ratio of the first terminal device is different from the calculation method used when the two APs perform the concurrent transmission. For example, there is a process in which an AP 1, an AP 2, and an AP 3 perform concurrent transmission. As shown in FIG. 4, the first terminal device is associated with the AP 1, and is not associated with the AP 2 or AP 3. The signal to interference plus noise ratio of the first terminal device may be expressed as:

$$SINR_{STA1}=10 \log (R[AP1][STA1]/(R[AP2][STA1]+R[AP3][STA1])$$

R[AP1][STA1] indicates a signal strength from the AP 1 to the STA 1, R[AP2][STA1] indicates a signal strength from the AP 2 to the STA 1, and R[AP3][STA1] indicates a signal strength from the AP 3 to the STA 1.

The following relational expressions may be determined with reference to the foregoing relational expression used when the two APs perform the concurrent transmission:

$$R[AP1][STA1]=TxAP1-PL1=TxAP1-TxSP1-R[STA1][AP1]$$

$$R[AP2][STA1]=TxAP2-PL2=TxAP2-TxSP1-R[STA1][AP2]$$

$$R[AP3][STA1]=TxAP3-PL3=TxAP3-TxSP1-R[STA1][AP3]$$

PL3 is a path loss from the AP 3 to the STA 1, and TxAP3 is a transmit power of the AP 3.

The signal to interference plus noise ratio of the first terminal device when the three APs perform the concurrent transmission may be determined by substituting the several relational expressions into the foregoing relational expression $SINR_{STA1}=10 \log(R[AP1][STA1]/(R[AP2][STA1]+R[AP3][STA1])$.

In the method for concurrent transmission between access points, the first access point and the second access point each can measure the signal strength by using the first response frame in a process of communication between the first access point and the first terminal device, without relying on the first terminal device to measure a strength of a downlink signal between the first access point and the second access point. This reduces dependence on the terminal device in a process of measuring the signal strength in the concurrent transmission between the access points.

In embodiments of this application, to achieve different optimization objectives, the method for concurrent transmission between access points may include several optional solutions such as a solution of determining a signal strength based on time synchronization, a solution of selecting a secondary access point, and a solution of pre-scheduling the concurrent transmission. The following separately describes these solutions.

1. The Solution of Determining the Signal Strength Based on the Time Synchronization It is considered that the first access point and the second access point each may receive a plurality of response frames, and the second access point may send a plurality of signal strengths to the first access point. The first terminal device may send different response frames at different transmit powers, and the different transmit powers affect signal strengths of the response frames. Therefore, to improve accuracy of adjustment on the power of the second access point, the first access point needs to determine which signal strength from the second access point is the second signal strength from the same response frame as the first signal strength.

In embodiments of this application, the solution of determining the signal strength based on the time synchronization is used, so that the first access point determines that the first signal strength and the second signal strength are from a same response frame. For the process, refer to FIG. 5 for understanding.

Figure 5:
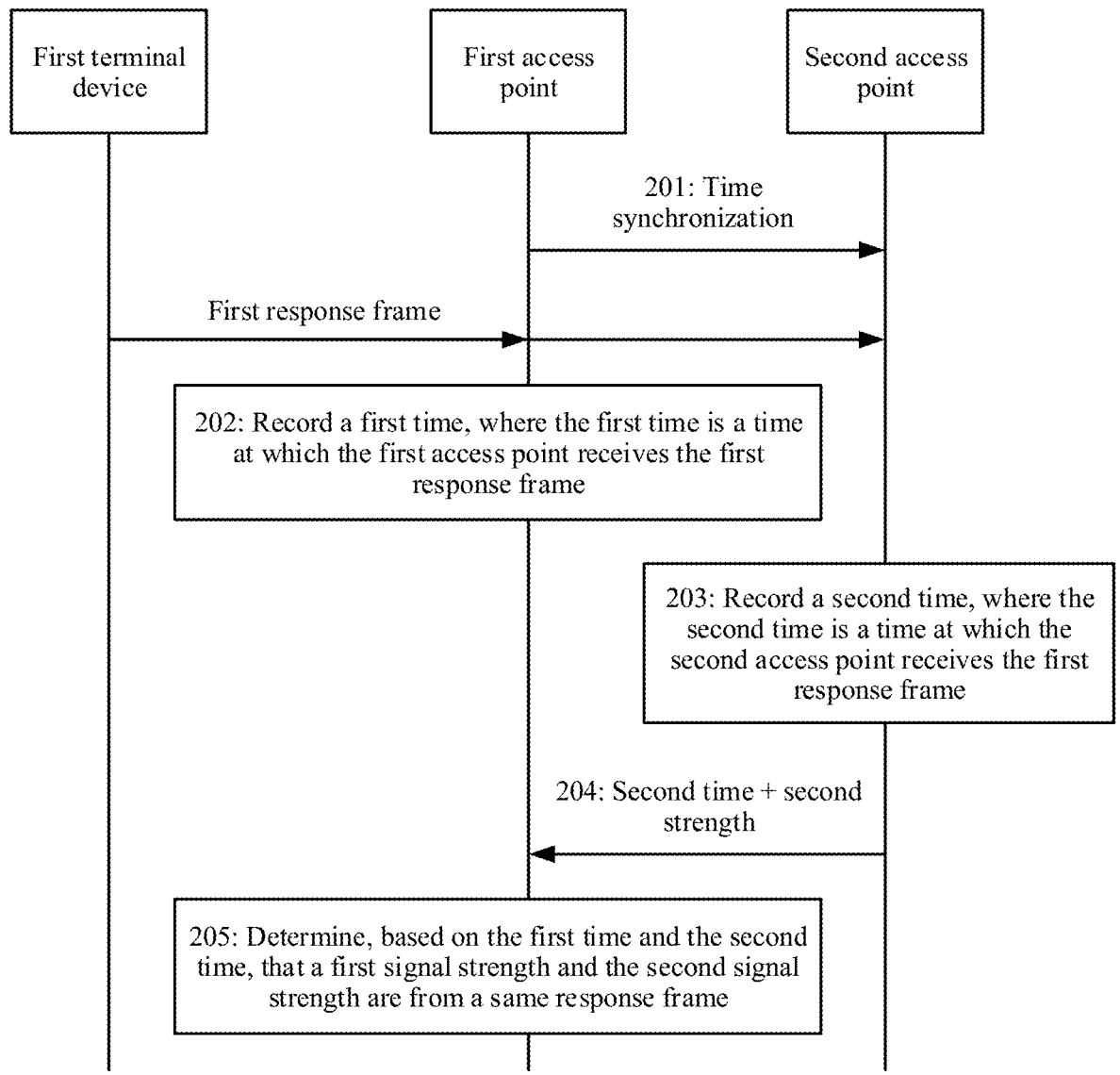
FIG. 5 is a schematic diagram of another embodiment of a method for concurrent transmission between access points according to an embodiment of this application.

FIG. 5 shows another embodiment of the method for concurrent transmission between access points according to embodiments of this application. The following steps are included.

201: The first access point performs the time synchronization with the second access point.

There may be a plurality of methods for performing the time synchronization in embodiments of this application, for example, performing time synchronization by using a beacon frame, performing time synchronization by using a network time protocol (NTP), or performing time synchronization by using a precision time protocol (PTP). A first time may be recorded in a form of a timestamp. The first access point associates the first time with the first signal strength.

202: The first access point records the first time, where the first time is a time at which the first access point receives the first response frame.

203: The second access point records a second time, where the second time is a time at which the second access point receives the first response frame.

The second time may be recorded in a form of a timestamp. The second time and the second signal strength are usually indicated by a same message sent to the first access point.

204: The second access point indicates the second time to the first access point.

205: The first access point determines, based on the first time and the second time, that the first signal strength and the second signal strength are from a same response frame.

If the first signal strength and the second signal strength are from the same response frame, the first time and the second time are usually the same, or an absolute value of a difference between the first time and the second time is less than a preset threshold. Therefore, the second signal strength from the same response frame as the first signal strength can be determined based on the first time and the second time.

In the solution of the embodiment corresponding to FIG. 5, the first access point determines, based on the first time and the second time, that the first signal strength and the second signal strength are from a same response frame. This can diminish the impact of the different transmit powers at which the first terminal device transmits the different response frames on the signal strength measured by the second access point, and improve the accuracy of the power, the power upper limit, or the power adjustment value that is determined by the first access point based on the first signal strength and the second signal strength and that is to be used by the second access point when the second access point and the first access point perform the concurrent transmission.

2. The Solution of Selecting the Secondary Access Point

In embodiments of this application, when the first access point is a primary access point in the concurrent transmission and the first terminal device is a destination end in the concurrent transmission, the first access point determines, based on at least one factor, that the second access point is a secondary access point in the concurrent transmission. The at least one factor includes the first signal strength and the second signal strength.

A primary access point is referred to as a sharing access point (sharing AP) in a CO-SR mechanism, and a secondary access point is referred to as a shared access point (shared AP) in the CO-SR mechanism. The primary access point and the secondary access point may also be referred to by other names in another concurrent transmission mechanism.

There may be two solutions of selecting the secondary access point in embodiments of this application. One solution is to select the secondary access point based on signal strengths, and the other solution is to select the secondary access point based on signal strengths and service requirements of candidate access points. The following separately describes the solutions.

1. Select the Secondary Access Point Based on the Signal Strengths.

In embodiments of this application, there may be three rules for selecting the secondary access point based on the signal strengths. The following separately describes the three rules.

Rule 1: The first access point determines, in a plurality of candidate access points based on the difference between the first signal strength and the second signal strength, that the second access point is the secondary access point in the concurrent transmission, where the difference between the first signal strength and the second signal strength is the largest of the differences between the first signal strength and signal strengths corresponding to the plurality of candidate access points.

Rule 1 is based on a case in which each candidate access point receives a different response frame sent by the first terminal device. In this case, an access point corresponding to the largest difference of the differences about the signal strengths corresponding to the plurality of candidate access points may be determined as the secondary access point. For example, the primary access point receives a response frame A sent by the first terminal device, and measures a signal strength of the response frame A to obtain a signal strength A1. A candidate access point 1 receives the response frame A, and measures a signal strength of the response frame A to obtain a signal strength A2. The primary access point receives a response frame B sent by the first terminal device, and measures a signal strength of the response frame B to obtain a signal strength B1. A candidate access point 2 receives the response frame B, and measures a signal strength of the response frame B to obtain a signal strength B2. The primary access point receives a response frame C sent by the first terminal device, and measures a signal strength of the response frame C to obtain a signal strength C1. A candidate access point 3 receives the response frame C, and measures a signal strength of the response frame C to obtain a signal strength C2. In this example, the primary access point may determine a candidate access point corresponding to the largest difference as between a difference between the signal strength A1 and the signal strength A2, a difference between the signal strength B1 and the signal strength B2, and a difference between the signal strength C1 and the signal strength C2 as the secondary access point. For example, if the difference between the signal strength A1 and the signal strength A2 is the largest, the primary access point determines the candidate access point 1 as the secondary access point.

Rule 2: The first access point determines, based on the difference between the first signal strength and the second signal strength, a candidate access point corresponding to the largest difference of the differences between signal strengths measured by candidate access points and the first signal strength as the secondary access point.

Rule 2 is based on a case in which an operating channel of each of the plurality of candidate access points overlaps the operating channel of the first access point. Each candidate access point may receive a response frame sent by the first terminal device. If each candidate access point receives the first response frame, each candidate access point notifies the first access point of a signal strength obtained by measuring a signal strength of the first response frame. Then, the secondary access point may be selected based on a difference between the first signal strength and the signal strength measured by each candidate access point. For example, the primary access point receives a response frame A sent by the first terminal device, and measures a signal strength of the response frame A to obtain a signal strength A1. A candidate access point 1 receives the response frame A sent by the first terminal device, and measures a signal strength of the response frame A to obtain a signal strength A2. A candidate access point 2 receives the response frame A sent by the first terminal device, and measures a signal strength of the response frame A to obtain a signal strength A3. A candidate access point 3 receives the response frame A sent by the first terminal device, and measures a signal strength of the response frame A to obtain a signal strength A4. In this example, the primary access point may determine a candidate access point corresponding to the largest difference as between a difference between the signal strength A1 and the signal strength A2, a difference between the signal strength A1 and the signal strength A3, and a difference between the signal strength A1 and the signal strength A4 as the secondary access point. For example, if the difference between the signal strength A1 and the signal strength A2 is the largest, the primary access point determines the candidate access point 1 as the secondary access point.

Rule 3: The first access point determines a candidate access point corresponding to the smallest signal strength in a plurality of candidate access points as a secondary access point.

Rule 3 is based on a case in which each candidate access point may receive a response frame sent by the first terminal device. If each candidate access point receives the first response frame, each candidate access point notifies the first access point of a signal strength obtained by measuring a signal strength of the first response frame. Then, the candidate access point corresponding to the smallest signal strength may be determined as the secondary access point. For example, the primary access point receives a response frame A sent by the first terminal device, and measures a signal strength of the response frame A to obtain a signal strength A1. A candidate access point 1 receives the response frame A sent by the first terminal device, and measures a signal strength of the response frame A to obtain a signal strength A2. A candidate access point 2 receives the response frame A sent by the first terminal device, and measures a signal strength of the response frame A to obtain a signal strength A3. A candidate access point 3 receives the response frame A sent by the first terminal device, and measures a signal strength of the response frame A to obtain a signal strength A4. In this example, a candidate access point corresponding to the smallest signal strength in the signal strength A2, the signal strength A3, and the signal strength A4 may be determined as the secondary access point. For example, if the signal strength A2 is the smallest, the primary access point determines the candidate access point 1 as the secondary access point.

A unit of the signal strength may be milliwatt, or may be decibel-milliwatt (dBm) in embodiments of this application. A unit of the signal strength used in this application is dBm. Therefore, a difference between signal strengths is used as a selection condition.

In embodiments of this application, in Rule 1 and Rule 2, because the difference between the first signal strength and the second signal strength is the largest of the differences between the first signal strength and the signal strengths corresponding to the plurality of candidate access points, a strength of a signal from the selected secondary access point is the smallest when the signal reaches the first terminal device. This has the smallest interference to the first terminal device, and helps improve concurrent transmission quality. Likewise, in Rule 3, the signal strength corresponding to the secondary access point is the smallest in the signal strengths corresponding to all the candidate access points, so that a strength of a signal from the secondary access point is the smallest when the signal reaches the first terminal device. This has the smallest interference to the first terminal device, and helps improve concurrent transmission quality.

2. Select the Secondary Access Point Based on the Signal Strengths and the Service Requirements of the Candidate Access Points.

In this solution of selecting the secondary access point, the first access point determines, based on the first signal strength, the second signal strength, and the service requirements of the plurality of candidate access points, that the second access point is the secondary access point in the concurrent transmission.

The service requirements of the plurality of candidate access points may be sent by the plurality of candidate access points to the first access point in advance. The service requirement may include at least one of a service type, a traffic identifier (TID), a buffer size, a guarantee requirement level, or a service priority.

In embodiments of this application, there may be three rules for comprehensively determining the secondary access point based on the signal strengths and the service requirements. The following separately describes the three rules.

Rule 1: The signal strengths are preferably considered. According to the foregoing described rule, at least two access points are first determined from the plurality of candidate access points based on the signal strengths, and then at least one access point is selected from the at least two access points as the secondary access point according to the service requirements. For example, at least two first ranked candidate access points are first selected from the candidate access points corresponding to differences about signal strengths sorted in descending order, and then at least one candidate access point with the highest service priority is selected from the at least two candidate access points as the secondary access point.

Rule 2: The service requirements are preferably considered. At least two access points are determined from the plurality of candidate access points based on the service requirements, and then at least one access point is selected from the at least two access points as the secondary access point based on the signal strengths and the rule described above. For example, at least two first ranked candidate access points are first selected from the candidate access points corresponding to service priorities sorted in descending order, and then at least one candidate access point corresponding to the largest difference about signal strengths is selected from the at least two candidate access points as the secondary access point.

Rule 3: A weight is configured for each of the signal strength and the service requirement, then a decision value is calculated for each candidate access point with reference to the two indicators (the signal strength and the service requirement), and the secondary access point is selected based on the decision value. For example, a candidate access point corresponding to the largest decision value is selected as the secondary access point.

In embodiments of this application, the secondary access point is determined with reference to the signal strengths and the service requirements, and this helps transmit a high-priority service in advance.

Figure 6:
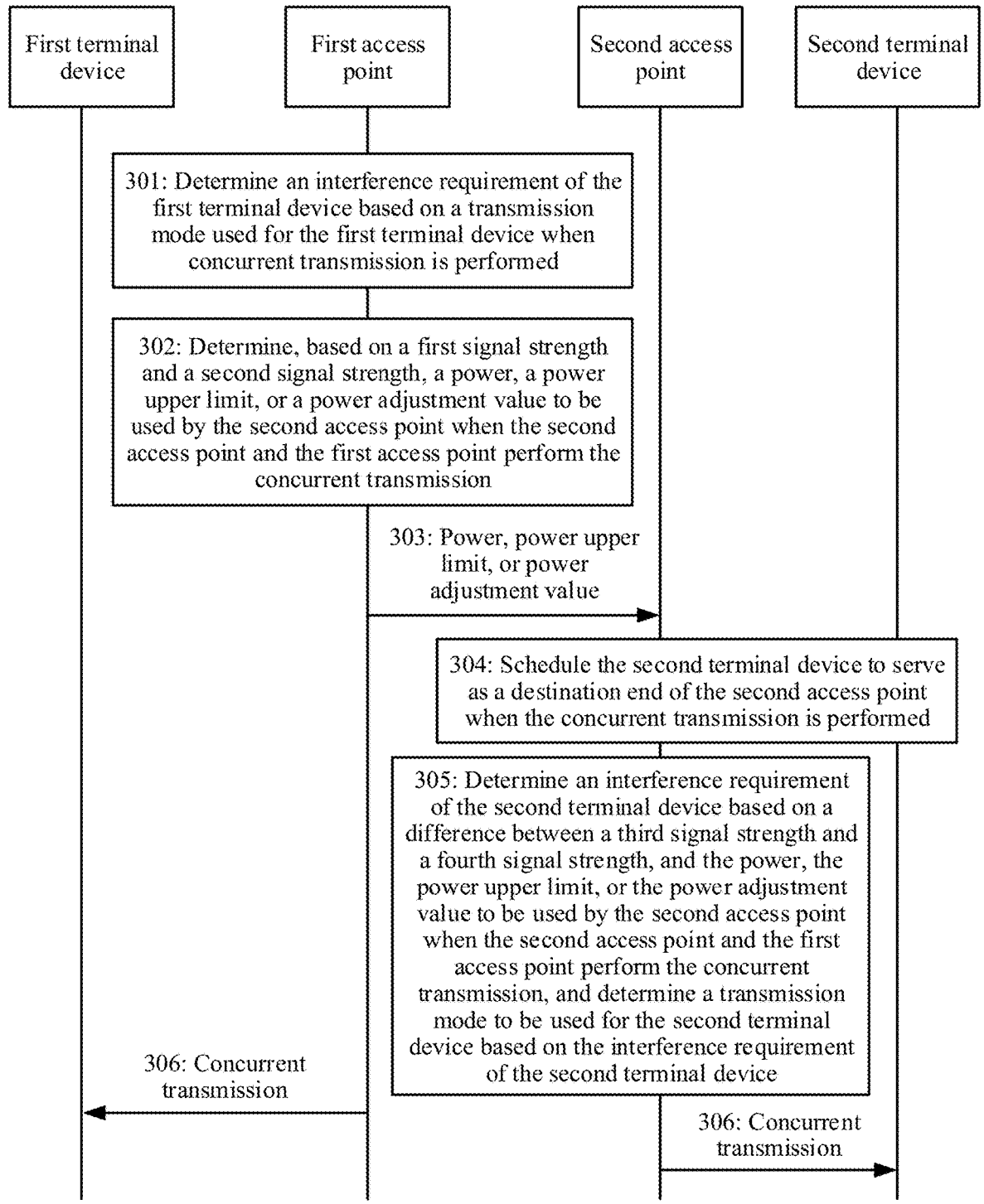
FIG. 6 is a schematic diagram of another embodiment of a method for concurrent transmission between access points according to an embodiment of this application.

In embodiments of this application, regardless of which solution is used to determine the secondary access point, after the second access point is determined as the secondary access point, both the first access point and the second access point in embodiments of this application may perform a process shown in FIG. 6.

301: The first access point determines an interference requirement of the first terminal device based on a transmission mode used for the first terminal device when the concurrent transmission is performed.

The transmission mode may include one or more of the following transmission-related information: a power, a quantity of space-time streams, a transmission rate, a modulation and coding scheme (MCS), and the like when the first access point performs the concurrent transmission. The interference requirement is a requirement of the first terminal device on signal quality, for example, an SINR or a signal-to-interference ratio SIR.

302: The first access point determines, based on the first signal strength and the second signal strength, the power, the power upper limit, or the power adjustment value to be used by the second access point when the second access point and the first access point perform the concurrent transmission.

303: The first access point indicates, to the second access point, the power, the power upper limit, or the power adjustment value to be used by the second access point when the second access point and the first access point perform the concurrent transmission.

The second access point may determine a transmit power based on the power, the power upper limit, or the power adjustment value of the second access point, and then send a signal based on the transmit power. In this way, after being adjusted based on the difference between the first signal strength and the second signal strength, the signal sent by the second access point at the transmit power meets the interference requirement of the first terminal device. The transmit power herein indicates a real power used by the second access point when the second access point transmits the signal, and the transmit power may include the power determined by the first access point, a power selected by the second access point based on the power upper limit, or a power obtained through adjustment by the second access point based on the power adjustment value.

In the foregoing embodiment, if the first access point determines that the power of the second access point is 16 dBm, the power of the second access point is 16 dBm. When the power selected by the second access point based on the power upper limit is determined, for example, if the power upper limit is 18 dBm, and the second access point transmits the signal at the transmit power of 16 dBm, the power selected by the second access point based on the power upper limit is 16 dBm. When the power obtained through adjustment by the second access point based on the power adjustment value is determined, for example, if the power adjustment value is 2 dB, and the second access point transmits the signal at the transmit power of 16 dBm after 2 dB is decreased based on a current power of 18 dBm, the power obtained through adjustment by the second access point based on the power adjustment value is 16 dBm.

In embodiments of this application, when an AP 1 used as a primary access point adjusts a power of an AP 2 used as a secondary access point, the AP 1 can determine an SINR threshold γ of an STA 1 based on the transmission-related information such as a power, a transmission rate, and a quantity of space-time streams of the STA 1 scheduled by the AP 1. In a concurrent transmission process, the AP 1 controls an SINR of the STA 1 to be greater than the threshold γ, that is, a lower limit of the SINR of the STA 1 is γ. A difference between a signal strength from the STA 1 to the AP 1 and a signal strength from the STA 1 to the AP 2 is R[STA1][AP1]−R[STA1][AP2]. In this case, the AP 2 needs to reduce the power of the AP 2 by R[STA1][AP1]−R[STA1][AP2]−γ. A specific power adjustment and control method may be that the AP 1 determines the transmit power of the AP 2 based on R[STA1][AP1]−R[STA1][AP2]−γ, and then notifies the AP 2 of the transmit power, and the AP 2 performs adjustment based on the transmit power. Alternatively, the AP 1 may determine a power upper limit of the AP 2 based on R[STA1][AP1]−R[STA1][AP2]−γ, and then the AP 2 automatically adjusts the transmit power based on the power upper limit. Alternatively, the AP 1 may directly notify the power adjustment value R[STA1][AP1]−R[STA1][AP2]−γ to the AP 2, and the AP 2 reduces the power based on the power adjustment value.

304: The second access point schedules a second terminal device to serve as a destination end of the second access point when the concurrent transmission is performed.

A process in step 304 may include the following steps.

The second access point sends a second downlink frame to the second terminal device, receives, from the second terminal device, a second response frame corresponding to the second downlink frame, and measures a signal strength of the second response frame to obtain a third signal strength, where the second terminal device is associated with the second access point, and the second terminal device is not associated with the first access point.

For types of the second downlink frame and the second response frame and a relationship between the second downlink frame and the second response frame, refer to the types of the first downlink frame and the first response frame and the relationship between the first downlink frame and the first response frame in the first aspect for understanding.

The first access point measures a signal strength of the second response frame to obtain a fourth signal strength, and send a message to the second access point to indicate the fourth signal strength.

The second access point schedules, based on a difference between the third signal strength and the fourth signal strength, the second terminal device to serve as the destination end of the second access point when the concurrent transmission is performed.

The second access point used as the secondary access point schedules the associated second terminal device to perform the concurrent transmission with the first access point. A scheduling principle is scheduling a user corresponding to the largest difference between a signal strength from the second terminal device (represented by using an STA 2) to the AP 2 and a signal strength from the STA 2 to the AP 1 (a difference between a third signal strength and a fourth signal strength).

In embodiments of this application, a larger difference between the third signal strength and the fourth signal strength indicates a smaller influence of the first access point on the second terminal device. The second terminal device is scheduled as the destination end, and this can improve data transmission quality during the concurrent transmission.

305: The second access point determines an interference requirement of the second terminal device based on the difference between the third signal strength and the fourth signal strength and the power, the power upper limit, or the power adjustment value to be used by the second access point when the second access point and the first access point perform the concurrent transmission, and determines a transmission mode to be used for the second terminal device based on the interference requirement of the second terminal device.

The difference between the third signal strength and the fourth signal strength may be represented as R [STA2][AP2]−R[STA2][AP1], where [STA2][AP2] represents the third signal strength, and R[STA2][AP1] represents the fourth signal strength. In addition, the SINR of the STA 2 may be calculated. The SINR of the STA 2 may be expressed as R [STA2][AP2]−R[STA2][AP1]−(R[STA1][AP1]−R[STA1][AP2]−γ), and then an MCS or a transmission rate is selected for the STA 2 based on the SINR of the STA 2.

306: The first access point and the first terminal device perform the concurrent transmission, and the second access point and the second terminal device perform the concurrent transmission.

In embodiments of this application, the first access point can adjust the transmit power of the second access point based on the interference requirement and the difference between the first signal strength and the second signal strength. Therefore, when the second access point performs the concurrent transmission based on the transmit power, the interference requirement of the first terminal device can be met. The second access point determines the transmission mode to be used for the second terminal device based on the interference requirement of the second terminal, so that the second access point communicates with the second terminal device in the corresponding transmission mode. This can meet the interference requirement of the second terminal device, and improve data transmission quality during the concurrent transmission.

3. The Solution of Pre-Scheduling the Concurrent Transmission

The first access point sends a coordinated frame to the second access point, where the coordinated frame includes information about the concurrent transmission and information about a next concurrent transmission, the information about the concurrent transmission is used to indicate content in the concurrent transmission, and the information about the next concurrent transmission is used to indicate to the second access point to pre-schedule content in the next concurrent transmission. The information about the concurrent transmission may include the power, the power upper limit, or the power adjustment value to be used by the second access point when the second access point performs the concurrent transmission during the concurrent transmission. The information about the next concurrent transmission may include a format of data in the next concurrent transmission.

The second access point concurrently transmits, based on the information about the concurrent transmission, the content in the concurrent transmission with the first access point, and pre-schedules, based on the information about the next concurrent transmission, the content in the next concurrent transmission.

Figure 7:
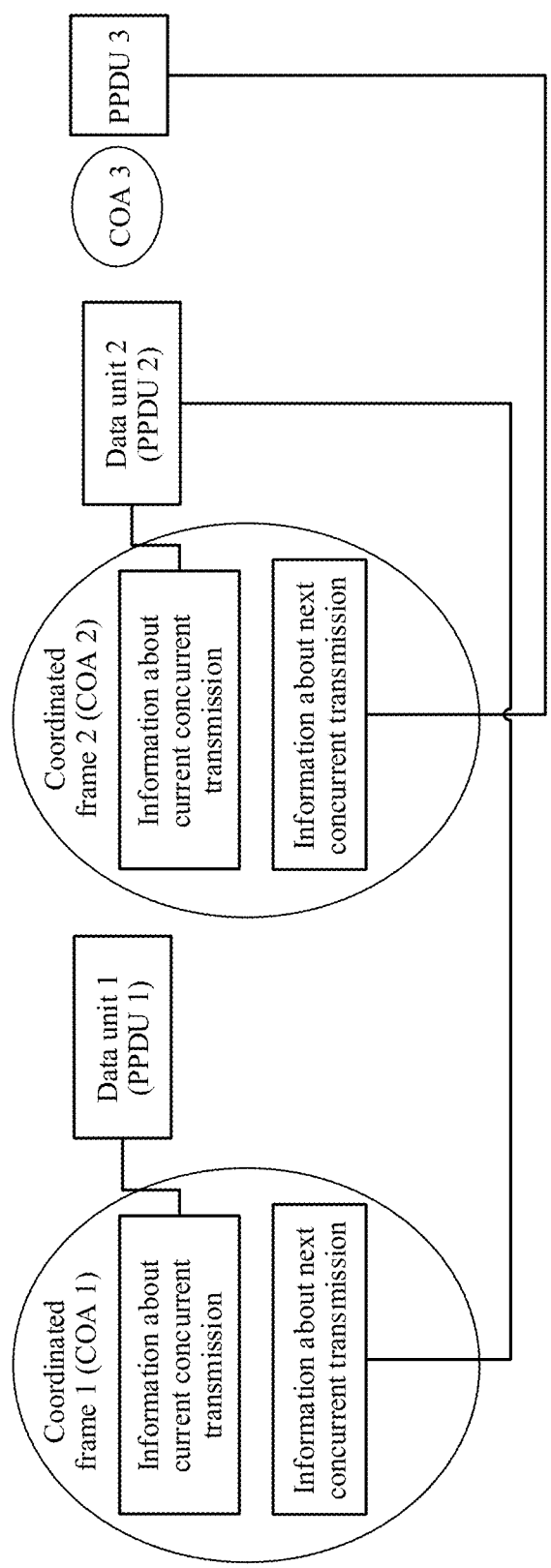
FIG. 7 is a schematic diagram of a structure of pre-scheduling in a method for concurrent transmission between access points according to an embodiment of this application.

For the pre-scheduling process, refer to FIG. 7 for understanding. As shown in FIG. 7, in a concurrent transmission process, the first access point continuously sends a coordinated frame (COA) 1, a COA 2, a COA 3, and more subsequent COAs, which are not shown one by one in FIG. 7. Each COA includes information about current concurrent transmission and information about a next concurrent transmission. The second access point schedules content in the current concurrent transmission based on the information about the current concurrent transmission. For example, the second access point schedules a physical layer protocol data unit (PPDU) 1, based on information about the current concurrent transmission in the COA 1, and schedules a PPDU 2 based on information about the current concurrent transmission in the COA 2. In FIG. 7, a PPDU is referred to as a data unit for short. The second access point pre-schedules content in the next concurrent transmission based on information about the next concurrent transmission. For example, the second access point pre-schedules a PPDU 2 based on information about the next concurrent transmission in the COA 1, and pre-schedules a PPDU 3 based on information about the next concurrent transmission in the COA 2.

In embodiments of this application, when performing the concurrent transmission, the second access point can pre-schedule the content in the next concurrent transmission. This can reduce a processing delay in the concurrent transmission when the next concurrent transmission is performed, and improve transmission efficiency of the next concurrent transmission.

The foregoing describes the communications system and the method for concurrent transmission between access points. The following describes access points in embodiments of this application with reference to the accompanying drawings.

Figure 8:
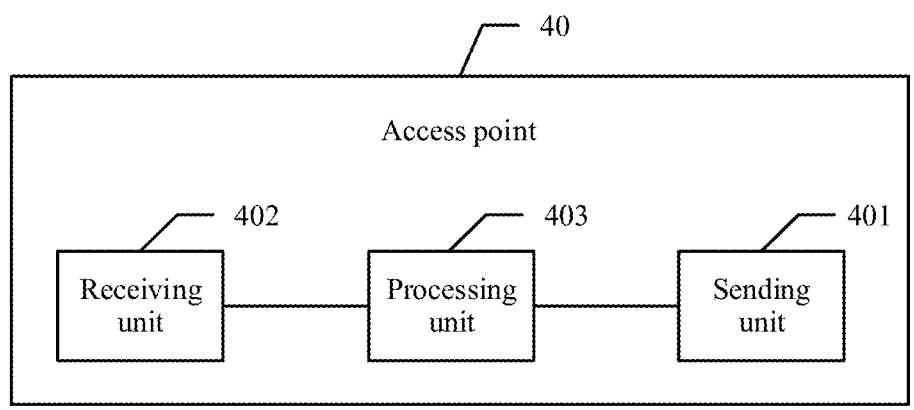
FIG. 8 is a schematic diagram of a structure of an access point according to an embodiment of this application.

FIG. 8 shows an embodiment of an access point 40 according to embodiments of this application. The access point 40 may be the first access point in the foregoing communications system and method embodiments. The access point 40 includes the following units.

A sending unit 401 is configured to send a first downlink frame to a first terminal device, where the first terminal device is associated with the first access point. The sending unit 401 may perform step 101 in the foregoing method embodiment.

A receiving unit 402 is configured to receive, from the first terminal device, a first response frame corresponding to the first downlink frame. The receiving unit 402 may perform step 102 in the foregoing method embodiment.

A processing unit 403 is configured to measure a signal strength of the first response frame received by the receiving unit 402 to obtain a first signal strength. The processing unit 403 may perform step 103 in the foregoing method embodiment.

The receiving unit 402 is further configured to receive a message that is sent by a second access point and that indicates a second signal strength, where the second signal strength is a signal strength of the first response frame measured by the second access point, the first terminal device is not associated with the second access point, and an operating channel of the second access point overlaps an operating channel of the first access point. The receiving unit 402 may further perform step 105 in the foregoing method embodiment.

The processing unit 403 is further configured to determine, based on the first signal strength and the second signal strength, a power, a power upper limit, or a power adjustment value to be used by the second access point when the second access point and the first access point perform concurrent transmission. The processing unit 403 may perform step 106 in the foregoing method embodiment.

In this embodiment of this application, the first access point and the second access point each can measure the signal strength by using the first response frame in a process of communication between the first access point and the first terminal device, without relying on the first terminal device to measure a strength of a downlink signal between the first access point and the second access point. This reduces dependence on the terminal device in a process of measuring the signal strength in the concurrent transmission between the access points.

Optionally, the processing unit 403 is further configured to: perform time synchronization with the second access point, and record a first time, where the first time is a time at which the first access point receives the first response frame. The processing unit 403 is further configured to perform steps 201 and 202 in the foregoing method embodiments.

The receiving unit 402 is further configured to receive a second time sent by the second access point, where the second time is a time at which the second access point receives the first response frame. The receiving unit 402 is further configured to perform step 204 in the foregoing method embodiment.

The processing unit 403 is further configured to determine, based on the first time and the second time, that the first signal strength and the second signal strength are from a same response frame. The processing unit 403 is further configured to perform step 205 in the foregoing method embodiment.

Optionally, the processing unit 403 is further configured to: when the first access point is a primary access point in concurrent transmission and the first terminal device is a destination end in the concurrent transmission, determine, based on at least one factor, that the second access point is a secondary access point in the concurrent transmission, where the at least one factor includes the first signal strength and the second signal strength.

Optionally, the processing unit 403 is specifically configured to determine, in a plurality of candidate access points based on a difference between the first signal strength and the second signal strength, that the second access point is the secondary access point in the concurrent transmission, where the difference between the first signal strength and the second signal strength is the largest of the differences between the first signal strength and signal strengths corresponding to a plurality of candidate access points.

Optionally, the processing unit 403 is specifically configured to determine, based on the first signal strength, the second signal strength, and service requirements of a plurality of candidate access points, that the second access point is the secondary access point in the concurrent transmission.

Optionally, the processing unit 403 is specifically configured to: determine an interference requirement of the first terminal device based on a transmission mode used for the first terminal device when the concurrent transmission is performed; and determine, based on the first signal strength and the second signal strength, the power, the power upper limit, or the power adjustment value to be used by the second access point when the second access point and the first access point perform the concurrent transmission, where a signal sent by the second access point at a transmit power meets the interference requirement of the first terminal device after being adjusted based on the difference between the first signal strength and the second signal strength, and the transmit power includes the power determined by the first access point, a power selected by the second access point based on the power upper limit, or a power obtained through adjustment by the second access point based on the power adjustment value.

Optionally, the processing unit 403 is further configured to obtain a fourth signal strength through a measurement on a second response frame on which the second access point obtains a third signal strength through a measurement, where the second response frame is sent by a second terminal device in response to a second downlink frame sent by the second access point, the second terminal device is associated with the second access point, and the second terminal device is not associated with the first access point.

The sending unit 401 is further configured to send a message to the second access point to indicate the fourth signal strength.

Optionally, the sending unit 401 is further configured to send a coordinated frame to the second access point, where the coordinated frame includes information about the concurrent transmission and information about the next concurrent transmission, the information about the concurrent transmission is used to indicate content in the concurrent transmission, and the information about the next concurrent transmission is used to indicate to the second access point to pre-schedule content in the next concurrent transmission.

Figure 9:
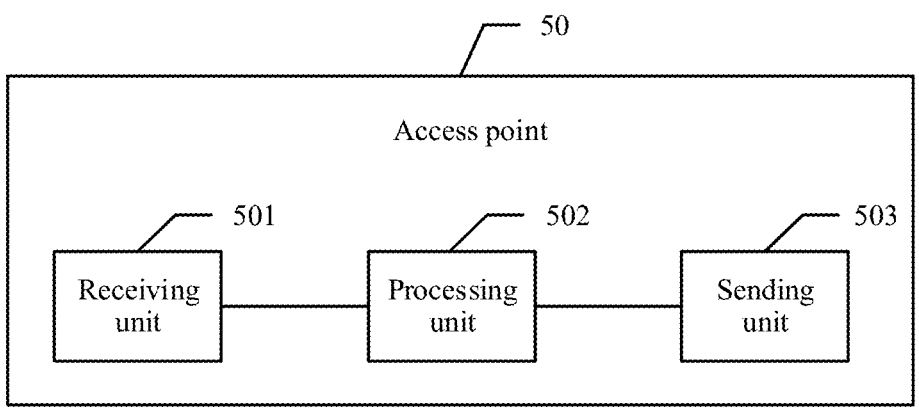
FIG. 9 is a schematic diagram of another structure of an access point according to an embodiment of this application.

FIG. 9 shows an embodiment of an access point 50 according to embodiments of this application. The access point 50 is the second access point in embodiments of the foregoing communications system or the method for concurrent transmission between access points. The access point 50 includes the following units.

A receiving unit 501 is configured to receive a first response frame, where the first response frame is sent by a first terminal device in response to a first downlink frame from a first access point, the first response frame is used by the first access point to measure a signal strength of the first response frame to obtain a first signal strength, and the first terminal device is associated with the first access point. The receiving unit 501 may perform step 102 in the foregoing method embodiment.

A processing unit 502 is configured to measure a signal strength of the first response frame to obtain a second signal strength, where the first terminal device is not associated with the second access point. The processing unit 502 may perform step 104 in the foregoing method embodiment.

A sending unit 503 is configured to send a message to the first access point to indicate the second signal strength, where the second signal strength is used by the first access point to determine, based on the first signal strength, a power, a power upper limit, or a power adjustment value to be used by the second access point when the second access point and the first access point perform concurrent transmission. The sending unit 503 may perform step 105 in the foregoing method embodiment.

In this embodiment of this application, the first access point and the second access point each can measure the signal strength by using the first response frame in a process of communication between the first access point and the first terminal device, without relying on the first terminal device to measure a strength of a downlink signal between the first access point and the second access point. This reduces dependence on the terminal device in a process of measuring the signal strength in the concurrent transmission between the access points.

Optionally, the processing unit 502 is further configured to perform time synchronization with the first access point, and record a second time, where the second time is a time at which the second access point receives the first response frame, the second time is used by the first access point to determine, with reference to a first time, that the first signal strength and the second signal strength are from a same response frame, and the first time is a time at which the first access point receives the first response frame. The processing unit 502 may further perform steps 201 and 203 in the foregoing method embodiment.

Optionally, the sending unit 503 is further configured to send a second downlink frame to a second terminal device, where the second terminal device is associated with the second access point, and the second terminal device is not associated with the first access point.

The receiving unit 501 is further configured to receive, from the second terminal device, a second response frame corresponding to the second downlink frame.

The processing unit 502 is further configured to measure a signal strength of the second response frame to obtain a third signal strength.

The receiving unit 501 is further configured to receive a message that is sent by the first access point and that indicates a fourth signal strength, where the fourth signal strength is obtained by the first access point by measuring a signal strength of the second response frame.

The processing unit 502 is further configured to schedule, based on a difference between the third signal strength and the fourth signal strength, the second terminal device to serve as the destination end of the second access point when the concurrent transmission is performed.

Optionally, the processing unit 502 is further configured to: determine an interference requirement of the second terminal device based on the difference between the third signal strength and the fourth signal strength, and the power, the power upper limit, or the power adjustment value to be used by the second access point when the second access point and the first access point perform the concurrent transmission, and determine a transmission mode to be used for the second terminal device based on the interference requirement of the second terminal device.

Optionally, the receiving unit 501 is further configured to receive a coordinated frame, where the coordinated frame includes information about the concurrent transmission and information about a next concurrent transmission, the information about the concurrent transmission is used to indicate content in the concurrent transmission, and the information about the next concurrent transmission is used to indicate to the second access point to pre-schedule content in the next concurrent transmission.

The processing unit 502 is further configured to: concurrently transmit, based on the information about the concurrent transmission, the content in the concurrent transmission with the first access point, and pre-schedule, based on the information about the next concurrent transmission, the content in the next concurrent transmission.

Optionally, the processing unit 502 is further configured to enable a function of receiving the first response frame.

Optionally, the sending unit 503 is specifically configured to send, through a wired network, the message to the first access point to indicate the second signal strength.

For the access point 40 and the access point 50 provided in embodiments of this application, refer to corresponding functions of the first access point and the second access point in the foregoing communications system and method embodiment for understanding. Details are not described herein again.

An embodiment of this application further provides a communications apparatus. The communications apparatus may be an access point (for example, a router), or may be a chip. The communications apparatus may be configured to perform actions performed by the first access point or the second access point in the foregoing method embodiment.

Figure 10:
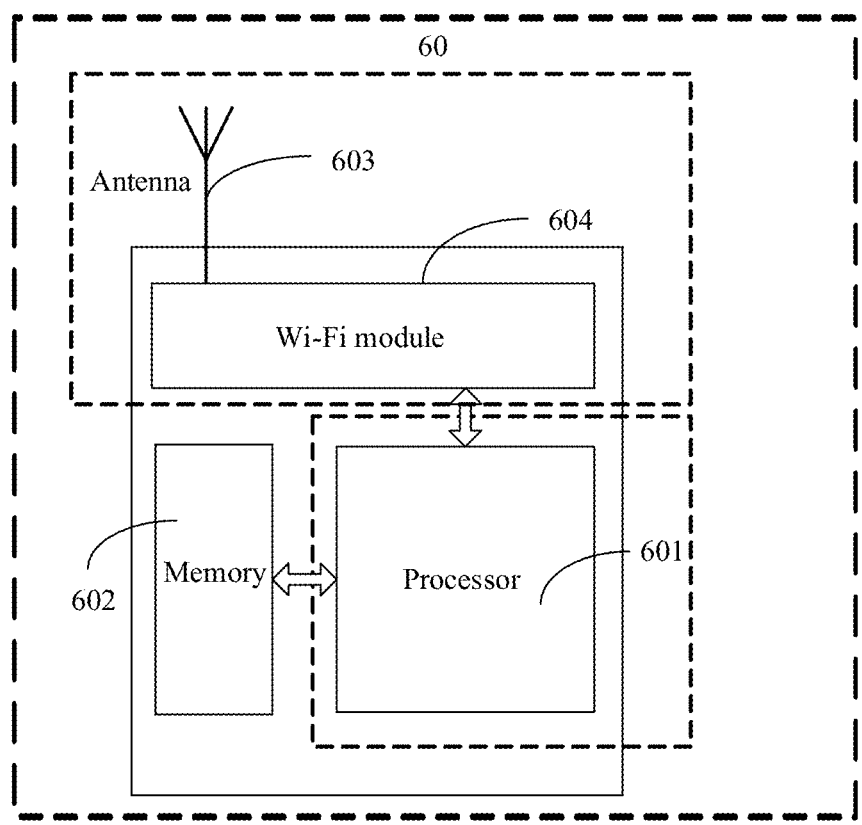
FIG. 10 is a schematic diagram of another structure of an access point according to an embodiment of this application.

When the communications apparatus is an access point 60, FIG. 10 is a schematic diagram of a structure of a simplified access point. For ease of understanding and illustration, as shown in FIG. 10, the access point includes a processor 601, a memory 602, an antenna 603, and a Wi-Fi module 604. The processor 601 is mainly configured to: process a communication protocol and communication data, control the access point, execute a software program, process data of the software program, and the like. The memory 602 is mainly configured to store the software program and the data. The antenna is mainly configured to receive and send a radio frequency signal in a form of an electromagnetic wave. The Wi-Fi module is configured to convert a serial port or a level into a signal that complies with a Wi-Fi wireless network communications standard.

The sending unit 401 and the receiving unit 402 in the access point 40 and the receiving unit 501 and the sending unit 503 in the access point 50 may be implemented through the antenna. The processing unit 403 and the processing unit 502 may be implemented by using the processor 601. The processor 601 is configured to control and manage an action of the access point. For example, the processor 601 is configured to perform step 102, step 103, or step 106 in FIG. 2, step 202, step 203, or step 205 in FIG. 5, and/or another process of the technology described in this specification.

The processor 601 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor 601 may be a combination of processors implementing a computing function, for example, a combination of one or more microprocessors, or a combination of a digital signal processor and a microprocessor.

When the communications apparatus is a chip, the chip includes a receiving unit, a sending unit, and a processing unit. The receiving unit and the sending unit may be an input/output circuit or a communications interface. The processing unit is a processor, a microprocessor, or an integrated circuit that is integrated on the chip.

In another form of this embodiment, a computer-readable storage medium is provided. The computer-readable storage medium stores instructions. When the instructions are executed, the method performed by the first access point or the second access point in the foregoing method embodiments is performed.

In another form of this embodiment, a computer program product including instructions is provided. The instructions are executed to perform the method performed by the first access point or the second access point in the foregoing method embodiments.

It should be understood that the processor mentioned in embodiments of the present invention may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be understood that the memory mentioned in embodiments of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example and not limitation, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate, a transistor logic device, or a discrete hardware component, the memory (storage module) is integrated into the processor.

What is claimed is:

1. A method for concurrent transmission between access points, comprising:
    sending, by a first access point, a first downlink frame to a first terminal device, associated with the first access point;
    receiving, by the first access point from the first terminal device, a first response frame corresponding to the first downlink frame;
    measuring, by the first access point, a signal strength of the first response frame to obtain a first signal strength;
    receiving, by the first access point, a message sent by a second access point that indicates a second signal strength, wherein the second signal strength is a signal strength of the first response frame measured by the second access point, the first terminal device is not associated with the second access point, and an operating channel of the second access point overlaps an operating channel of the first access point; and
    determining, by the first access point based on the first signal strength and the second signal strength, a power, a power upper limit, or a power adjustment value to be used by the second access point when the second access point and the first access point perform concurrent transmission.

2. The method according to claim 1, further comprising:
    performing, by the first access point, time synchronization with the second access point, and recording a first time at which the first access point receives the first response frame;
    receiving, by the first access point, a second time, sent by the second access point, at which the second access point receives the first response frame; and
    determining, by the first access point, based on the first time and the second time, that the first signal strength and the second signal strength are from a same response frame.

3. The method according to claim 1, further comprising:
    when the first access point is a primary access point in the concurrent transmission and the first terminal device is a destination end in the concurrent transmission, determining, by the first access point based on at least one factor, that the second access point is a secondary access point in the concurrent transmission, wherein the at least one factor comprises the first signal strength and the second signal strength.

4. The method according to claim 3, wherein determining, by the first access point, that the second access point is the secondary access point comprises:
- determining, by the first access point, based on a difference between the first signal strength and the second signal strength, that the second access point is the secondary access point in the concurrent transmission, wherein the difference between the first signal strength and the second signal strength is the largest difference between the first signal strength and signal strength corresponding to a plurality of candidate access points of which the first access point is one.

5. The method according to claim 3, wherein determining, by the first access point based on the at least one factor, that the second access point is the secondary access point in the concurrent transmission comprises:
- determining, by the first access point based on the first signal strength, the second signal strength, and service requirements of a plurality of candidate access points, that the second access point is the secondary access point in the concurrent transmission.

6. The method according to claim 1, wherein determining, by the first access point the power, the power upper limit, or the power adjustment value comprises:
- determining, by the first access point, an interference requirement of the first terminal device based on a transmission mode used for the first terminal device when the concurrent transmission is performed; and
- determining, by the first access point based on the first signal strength and the second signal strength, the power, the power upper limit, or the power adjustment value, a power selected by the second access point based on the power upper limit, or a power obtained through adjustment by the second access point based on the power adjustment value, wherein a signal sent by the second access point at a transmit power meets the interference requirement of the first terminal device after being adjusted based on the difference between the first signal strength and the second signal strength, and the transmit power comprises the power determined by the first access point.

7. The method according to claim 1, further comprising:
- obtaining, by the first access point, a fourth signal strength through a measurement on a second response frame on which the second access point obtains a third signal strength, wherein the second response frame is sent by a second terminal device in response to a second downlink frame sent by the second access point, the second terminal device is associated with the second access point, and the second terminal device is not associated with the first access point; and
- sending, by the first access point, a message to the second access point indicating the fourth signal strength.

8. The method according to claim 1, further comprising:
- sending, by the first access point, a coordinated frame to the second access point, wherein the coordinated frame comprises information about the concurrent transmission and information about a next concurrent transmission, the information about the concurrent transmission is used to indicate content in the concurrent transmission, and the information about the next concurrent transmission is used to indicate to the second access point to pre-schedule content in the next concurrent transmission.

9. A method for concurrent transmission, wherein the method is applied to a second access point whose operating channel overlaps an operating channel of a first access point, the method comprising:
- receiving, by the second access point, a first response frame, wherein the first response frame is sent by a first terminal device in response to a first downlink frame from the first access point, the first response frame is used by the first access point to measure a signal strength of the first response frame to obtain a first signal strength, and the first terminal device is associated with the first access point;
- measuring, by the second access point, a signal strength of the first response frame to obtain a second signal strength, wherein the first terminal device is not associated with the second access point; and
- sending, by the second access point, a message to the first access point to indicate the second signal strength, wherein the second signal strength is used by the first access point to determine, based on the first signal strength, a power, a power upper limit, or a power adjustment value to be used by the second access point when the second access point and the first access point perform concurrent transmission.

10. The method according to claim 9, further comprising:
- performing, by the second access point, time synchronization with the first access point, and recording a first time at which the second access point receives the first response frame, wherein the first time is used by the first access point to determine, with reference to a second time, that the first signal strength and the second signal strength are from a same response frame, and the second time being when the first access point receives the first response frame.

11. The method according to claim 9, further comprising:
- sending, by the second access point, a second downlink frame to a second terminal device, wherein the second terminal device is associated with the second access point, and the second terminal device is not associated with the first access point;
- receiving, by the second access point from the second terminal device, a second response frame corresponding to the second downlink frame;
- measuring, by the second access point, a signal strength of the second response frame to obtain a third signal strength;
- receiving, by the second access point, a message sent by the first access point that indicates a fourth signal strength, wherein the fourth signal strength is obtained by the first access point by measuring a signal strength of the second response frame; and
- scheduling, by the second access point, based on a difference between the third signal strength and the fourth signal strength, the second terminal device to serve as a destination end of the second access point when the concurrent transmission is performed.

12. The method according to claim 11, further comprising:
- determining, by the second access point, an interference requirement of the second terminal device based on the difference between the third signal strength and the fourth signal strength, and the power, the power upper limit, or the power adjustment value, and determining a transmission mode to be used for the second terminal device based on the interference requirement of the second terminal device.

13. The method according to claim 9, further comprising:
receiving, by the second access point, a coordinated frame comprising information about the concurrent transmission and information about next concurrent transmission, the information about the concurrent transmission is used to indicate content in the concurrent transmission, and the information about the next concurrent transmission is used to indicate the second access point to pre-schedule content in the next concurrent transmission; and
concurrently transmitting, by the second access point based on the information about the concurrent transmission, the content in the concurrent transmission with the first access point, and pre-scheduling, based on the information about the next concurrent transmission, the content in the next concurrent transmission.

14. The method according to claim 9, further comprising:
enabling, by the second access point, a function of receiving the first response frame.

15. The method according to claim 9, wherein sending, by the second access point, the message to the first access point comprises:
sending, by the second access point through a wired network, the message to the first access point to indicate the second signal strength.

16. An access point comprising:
a sending unit, configured to send a first downlink frame to a first terminal device associated with the access point;
a receiving unit, configured to receive, from the first terminal device, a first response frame corresponding to the first downlink frame; and
a processing unit, configured to measure a signal strength of the first response frame received by the receiving unit to obtain a first signal strength, wherein
the receiving unit is further configured to receive a message that is sent by a second access point and that indicates a second signal strength, wherein the second signal strength is of the first response frame that is measured by the second access point, the first terminal device is not associated with the second access point, and an operating channel of the second access point overlaps an operating channel of the access point; and
the processing unit is further configured to determine, based on the first signal strength and the second signal strength, a power, a power upper limit, or a power adjustment value to be used by the second access point when the second access point and the first access point perform concurrent transmission.

17. The access point according to claim 16, wherein the processing unit is further configured to:
perform a time synchronization with the second access point, and record a first time at which the first response frame is received;
receive from the second access point a second time at which the second access point received the first response frame; and
determine, based on the first time and the second time, that the first signal strength and the second signal strength are from a same response frame.

18. The access point according to claim 16, wherein when the access point is a primary access point in the concurrent transmission and the first terminal device is a destination end in the concurrent transmission, determining, by the access point based on at least one factor, that the second access point is a secondary access point in the concurrent transmission, wherein the at least one factor comprises the first signal strength and the second signal strength.

19. The access point according to claim 18, wherein the access point is one of a plurality of candidate access points and wherein determining, based on the at least one factor, that the second access point is the secondary access point in the concurrent transmission comprises:
determining, by the access point, based on a difference between the first signal strength and the second signal strength, that the second access point is the secondary access point in the concurrent transmission, wherein the difference between the first signal strength and the second signal strength is the largest difference between the first signal strength and signal strengths corresponding to the plurality of candidate access points.

20. An access point comprising:
a receiving unit, configured to receive a first response frame sent by a first terminal device in response to a first downlink frame from a second access point, the first response frame is used by the second access point to measure a signal strength of the first response frame to obtain a first signal strength, and the first terminal device is associated with the second access point;
a processing unit, configured to measure a signal strength of the first response frame to obtain a second signal strength, wherein the first terminal device is not associated with the access point; and
a sending unit, configured to send a message to the second access point to indicate the second signal strength, wherein the second signal strength is used by the second access point to determine, based on the first signal strength, a power, a power upper limit, or a power adjustment value to be used by the access point when the access point and the second access point perform concurrent transmission.

* * * * *

UNITED STATES PATENT AND TRADEMARK OFFICE
CERTIFICATE OF CORRECTION

| | | |
|---|---|---|
| PATENT NO. | : 12,127,015 B2 | Page 1 of 1 |
| APPLICATION NO. | : 17/856489 | |
| DATED | : October 22, 2024 | |
| INVENTOR(S) | : Bing Feng et al. | |

It is certified that error appears in the above-identified patent and that said Letters Patent is hereby corrected as shown below:

On the Title Page

In item (71), under "Applicant:" delete "GuangDong (CN)" and insert -- Shenzhen (CN) --.

In the Claims

In Column 30, Claim 1, Line 26, delete "device," and insert -- device --.

In Column 31, Claim 6, Line 24, delete "first access point the power," and insert -- first access point, --.

In Column 31, Claim 6, Line 24, delete "limit, or" and insert -- limit or --.

Signed and Sealed this
Twenty-first Day of January, 2025

Coke Morgan Stewart
*Acting Director of the United States Patent and Trademark Office*